US012122563B2

(12) United States Patent
Pentelovitch et al.

(10) Patent No.: US 12,122,563 B2
(45) Date of Patent: Oct. 22, 2024

(54) CONTAINER WITH SEALABLE LID

(71) Applicant: Helen of Troy Limited, St. Michael (BB)

(72) Inventors: Noah Ziman Pentelovitch, New York, NY (US); Conor Patrick McNamara, Montclair, NJ (US); Makiko Kida, Chiba (JP); Tamotsu Matsumoto, Chiba (JP); Nobuyuki Ogasawara, Chiba (JP); Yoshinori Nagata, Chiba (JP)

(73) Assignee: Helen of Troy Limited, St. Michael (BB)

( * ) Notice: Subject to any disclaimer, the term of this patent is extended or adjusted under 35 U.S.C. 154(b) by 138 days.

(21) Appl. No.: 17/987,108

(22) Filed: Nov. 15, 2022

(65) Prior Publication Data

US 2023/0070434 A1 Mar. 9, 2023

Related U.S. Application Data

(62) Division of application No. 16/708,508, filed on Dec. 10, 2019, now Pat. No. 11,524,820, which is a (Continued)

(51) Int. Cl.
*B65D 45/32* (2006.01)
*B65B 7/28* (2006.01)

(Continued)

(52) U.S. Cl.
CPC ................ *B65D 45/32* (2013.01); *B65B 7/28* (2013.01); *B65D 39/12* (2013.01); *B65D 45/327* (2013.01);

(Continued)

(58) Field of Classification Search
CPC ........ B65D 45/00–32; B65D 39/00–12; B65D 45/327; B65B 7/28; B67B 1/00; Y10S 277/00–915; Y10S 292/00–37
See application file for complete search history.

(56) References Cited

U.S. PATENT DOCUMENTS 2,186,795 A * 1/1940 Anderson ................ E05C 5/00 292/64
2,252,591 A * 8/1941 Anderson ........... E05B 65/0042 292/DIG. 37

(Continued)

FOREIGN PATENT DOCUMENTS

CN 102582944 7/2012
CN 202518588 11/2012
KR 100790549 1/2008

OTHER PUBLICATIONS

International Search Report for PCT/US2017/047482, Mailed Oct. 30, 2017, 11 pages.

(Continued)

*Primary Examiner* — Kareen K Thomas
(74) *Attorney, Agent, or Firm* — Rankin, Hill & Clark LLP

(57) ABSTRACT

A storage container assembly includes a container and a lid. The lid includes a top lid, a button, a gasket, a gasket pusher, and an arm. The button is moveable in a first axial direction between a projected position in which a top surface of the button is offset from an upper surface of the lid and a depressed position in which the top surface of the button is nearer to the upper surface. The gasket is moveable between a contracted state and an expanded state. The gasket pusher is moveable in a second axial direction, which is transverse to the first axial direction, and pushes the gasket. The arm operatively connects the button with the gasket pusher. Movement of the button from the projected position toward (Continued)

the depressed position results in pivotal movement of the arm and moves the gasket pusher in the second axial direction.

5 Claims, 20 Drawing Sheets

Related U.S. Application Data division of application No. 15/059,693, filed on Mar. 3, 2016, now Pat. No. 10,538,366.

(60) Provisional application No. 62/128,180, filed on Mar. 4, 2015.

(51) Int. Cl.
*B65D 39/12* (2006.01)
*B67B 1/00* (2006.01)

(52) U.S. Cl.
CPC ............. *B67B 1/00* (2013.01); *Y10S 277/915* (2013.01); *Y10S 292/37* (2013.01)

(56) References Cited

U.S. PATENT DOCUMENTS

| | | | | | |
|---|---|---|---|---|---|
| 2,604,225 | A | * | 7/1952 | Armstrong ........... | B65D 55/165 277/637 |
| 2,753,074 | A | * | 7/1956 | Schmid .................. | B65D 39/12 277/645 |
| 3,430,777 | A | | 3/1969 | Esposito, Jr. | |
| 3,606,070 | A | | 9/1971 | Shepherd | |
| 3,866,794 | A | * | 2/1975 | Kerr ....................... | B65D 53/02 220/256.1 |
| 4,303,171 | A | | 12/1981 | Schremmer | |
| 4,625,890 | A | * | 12/1986 | Galer ................... | B65D 45/327 220/795 |
| 4,765,498 | A | | 8/1988 | Rafferty | |
| 5,074,428 | A | * | 12/1991 | Wildfeuer .............. | B65D 45/32 220/322 |
| 5,225,125 | A | * | 7/1993 | Wildfeuer .............. | B65D 45/32 264/102 |
| 5,437,385 | A | | 8/1995 | Fillon | |
| 5,556,494 | A | * | 9/1996 | Schutz .................. | B29C 66/545 156/304.6 |
| 5,697,513 | A | * | 12/1997 | Molodyi ................ | B65D 45/32 277/921 |
| 6,536,618 | B1 | | 3/2003 | Hwang et al. | |
| 7,204,383 | B2 | | 4/2007 | Hsu | |
| 7,815,067 | B2 | | 10/2010 | Matsumoto | |
| 8,479,941 | B2 | | 7/2013 | Matsumoto et al. | |
| 8,807,370 | B2 | | 8/2014 | Lee | |
| 2007/0241107 | A1 | | 10/2007 | Matsumoto | |
| 2010/0282748 | A1 | | 11/2010 | Lu | |
| 2011/0186570 | A1 | * | 8/2011 | Perry ................. | B65D 43/0235 220/849 |
| 2012/0199588 | A1 | | 8/2012 | Wheeler | |
| 2013/0240532 | A1 | | 9/2013 | Lu | |
| 2014/0076899 | A1 | | 3/2014 | Ciccone | |
| 2014/0284333 | A1 | | 9/2014 | Poon | |

OTHER PUBLICATIONS

International Search Report for PCT/US2016/020626, Mailed May 11, 2016, 2 pages.

* cited by examiner

CONTAINER WITH SEALABLE LID

BACKGROUND

This disclosure is related to a storage container having a lid that is able to seal with the container. U.S. Pat. No. 7,815,067 discloses a similar type of container.

SUMMARY

A storage container assembly includes a container having an opening and a lid for covering the opening. The lid includes a top lid, a button, a gasket, a gasket pusher, and an arm. The top lid defines an upper surface of the lid. The button is moveable in a first axial direction with respect to the top lid between a projected position in which a top surface of the button is offset from the upper surface of the lid and a depressed position in which the top surface of the button is nearer to the upper surface of the lid as compared to the projected position. The gasket is moveable between a contracted state and an expanded state. The gasket pusher is moveable in a second axial direction, which is transverse to the first axial direction, between a retracted position and an extended position. The gasket pusher pushes the gasket toward the expanded state when moving from the retracted position toward the extended position. The arm operatively connects the button with the gasket pusher. Movement of the button from the projected position toward the depressed position results in pivotal movement of the arm and moves the gasket pusher in the second axial, which results in the gasket moving toward the expanded state.

A method for assembling a lid includes placing a cam mechanism on a base and placing a web on the base. The web includes gasket pushers and tensile connector elements. Each tensile connector element interconnects adjacent gasket pushers. The method further includes connecting a button with the cam mechanism, placing a top lid on the base and connecting the base with the top lid. The top lid includes a button opening receiving the button. The method also includes attaching a gasket to the base.

A web for expanding a gasket includes a hub, a plurality of arms connected with and extending outwardly from the hub, a plurality of gasket pushers each connected with a respective arm, and a plurality of tensile connector elements. Each gasket pusher includes a gasket contact surface for contacting the gasket, and movement of the hub in a first axial direction results in movement of the gasket pushers in a second axial direction, which is transverse to the first axial direction. Each of the tensile connector elements interconnects adjacent gasket pushers.

DETAILED DESCRIPTION

Figure 1:
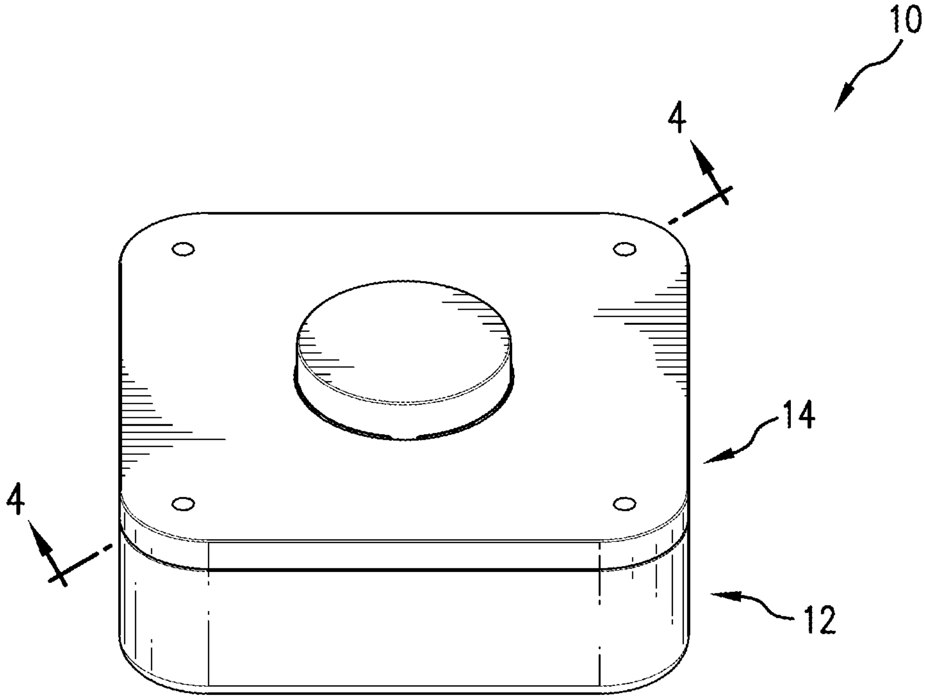
FIG. 1 is a perspective view of a container assembly including a container and a lid that is able to seal with the container.
Figure 2:
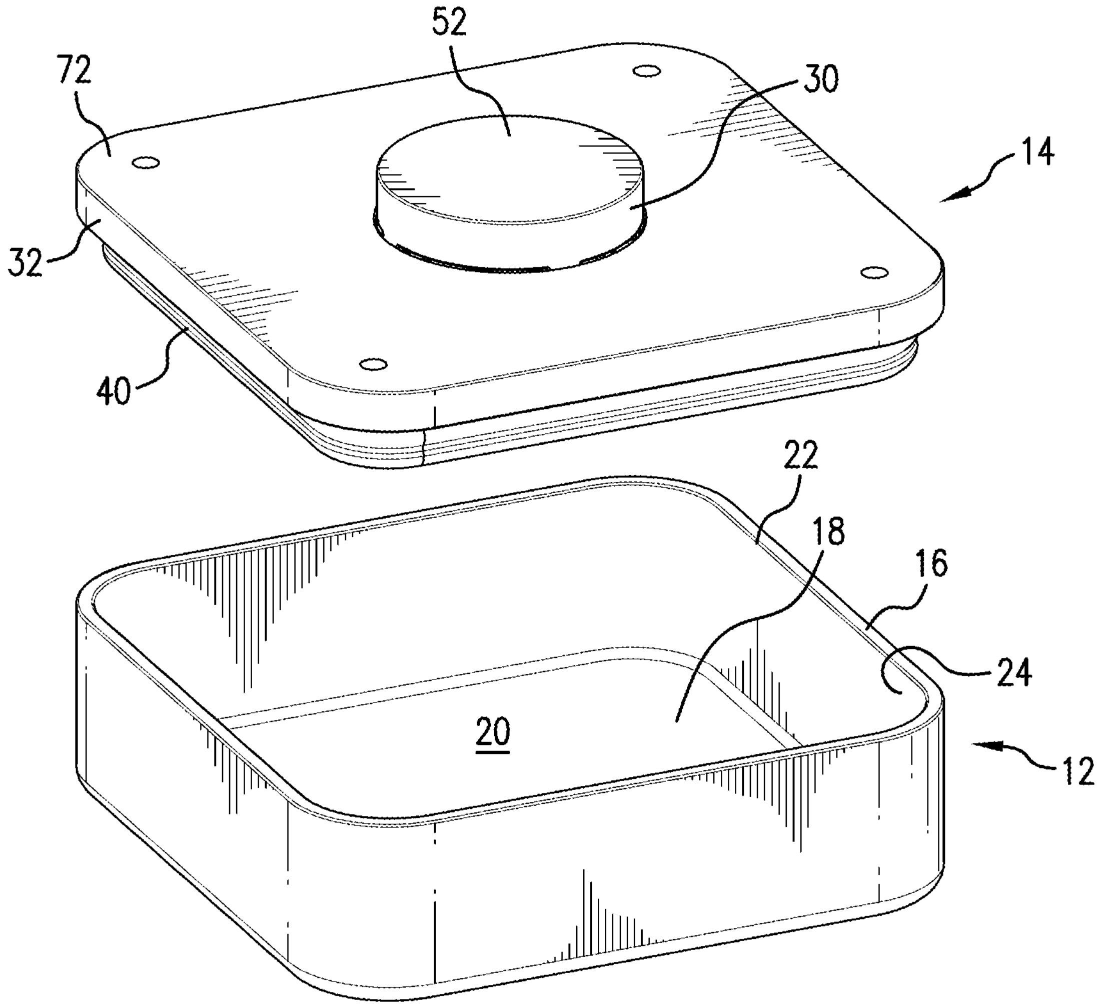
FIG. 2 is another perspective view of the container assembly with the lid removed from the container.

FIG. 1 depicts a storage container assembly 10 including a container 12 and a lid 14. FIG. 2 depicts the lid 14 removed from the container 12. The container 12 includes a side wall 16, which is generally rectangular in configuration (plan view), and a base wall 18. The side wall 16 extends upwardly from a perimeter of the base wall 18 and defines an inner volume 20 in which items can be placed. The side wall defines an upper opening 22 and the lid 14 covers this opening. The side wall 16 also defines an inner surface 24 for the container 12, and the lid 14 can seal against the inner surface 24.

Figure 3:
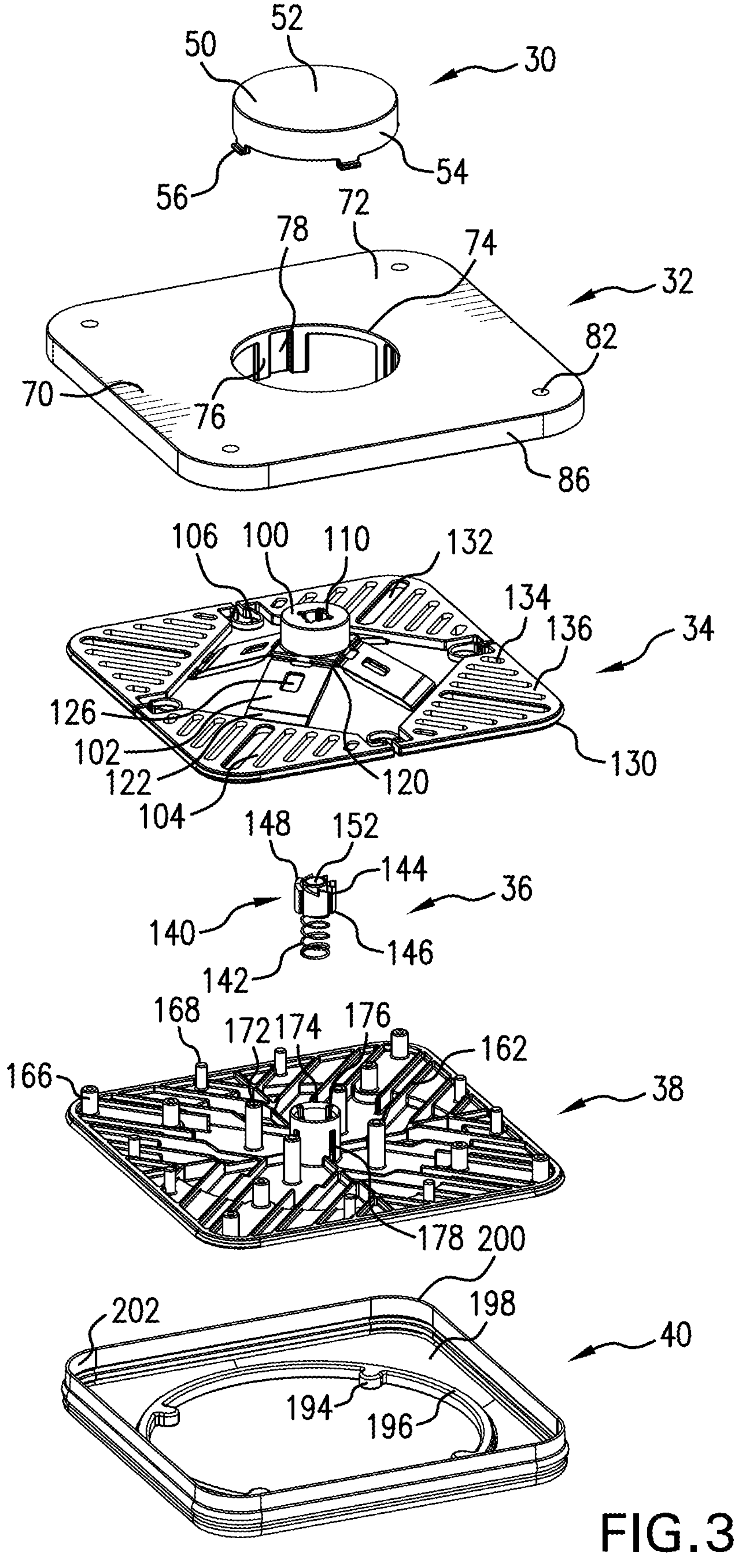
FIG. 3 is an exploded view of the lid for the container assembly depicted in FIGS. 1 and 2.
Figure 4:
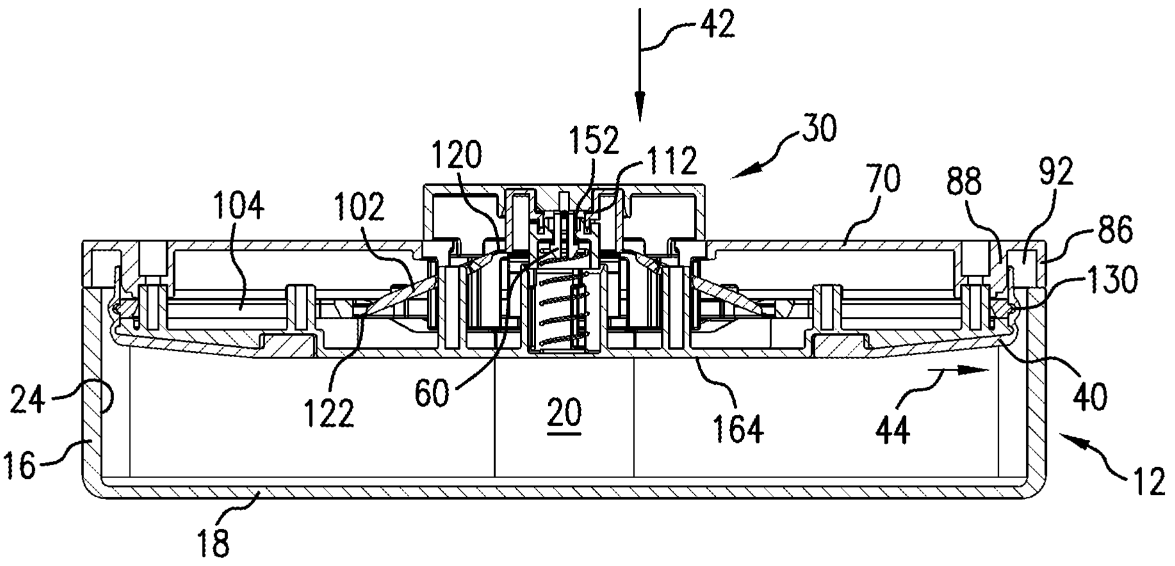
FIG. 4 is a cross-sectional view of the container assembly depicted in FIGS. 1 and 2 with the lid placed on the container, but not yet in a sealed condition.

FIG. 3 depicts an exploded view of the lid 14 shown in FIGS. 1 and 2. The lid 14 includes a button 30, a top lid 32, a web 34, a cam mechanism 36, a base 38, and a gasket 40. Movement of the button 30 results in movement of the gasket 40. With reference to FIG. 4, movement of the button 30 in a first axial direction, e.g. parallel with arrow 42, results in movement of the gasket 40 in a second axial direction, e.g. parallel with arrow 44, which is perpendicular to the first axial direction. Actuation of the button 30 moves the gasket 40 from a contracted state (shown in FIG. 4) toward an expanded state in which the gasket 40 would contact the inner surface 24 of the container 12.

Figure 5:
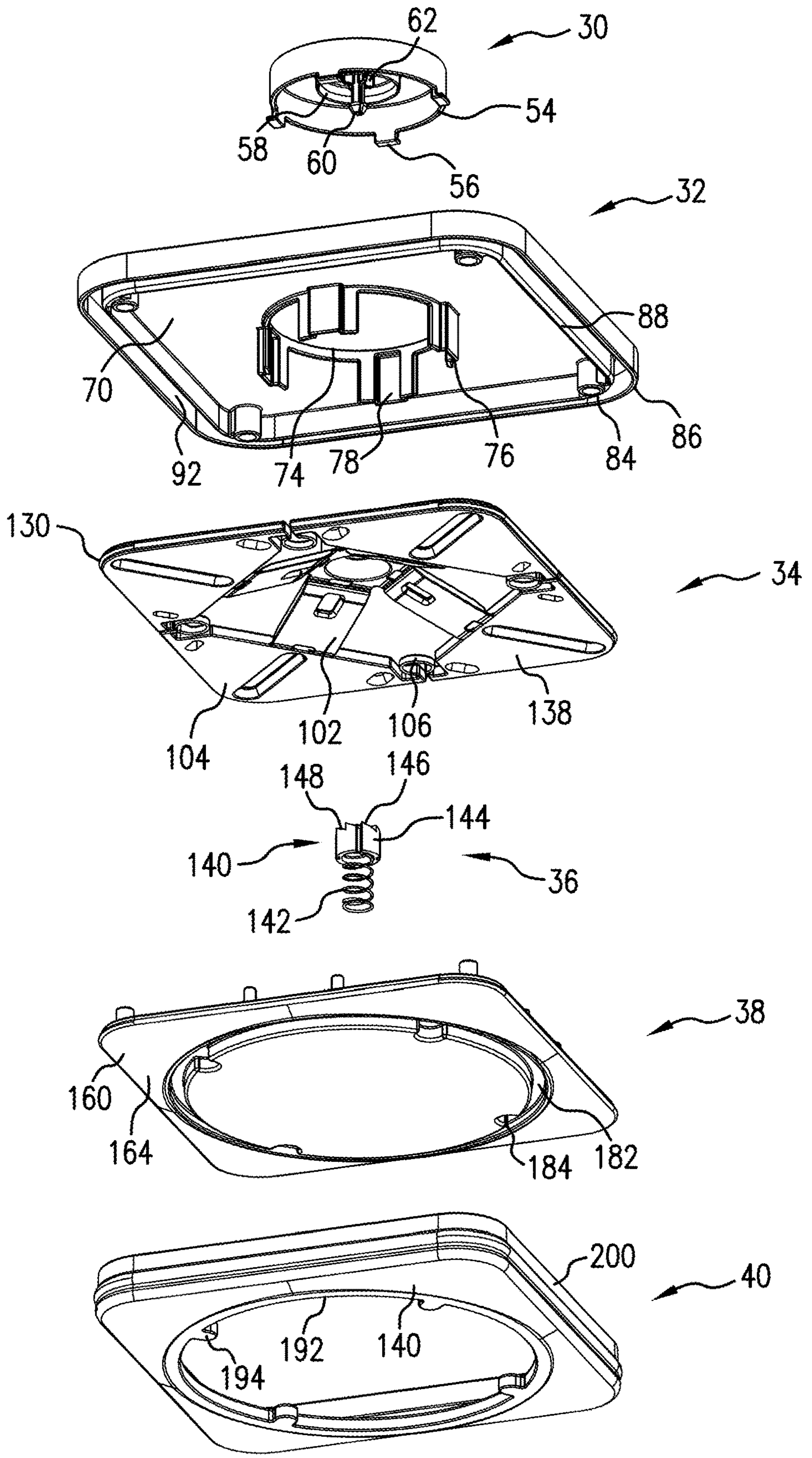
FIG. 5 is an exploded view of the lid of the container assembly depicted in FIGS. 1 and 2 from a different (lower) perspective than that shown in FIG. 3.

With reference back to FIG. 3, the button 30 is shown as generally circular in configuration, but the button could take other configurations such as square, rectangular, or other polygonal configurations. The button 30 includes an upper section 50 defining a top surface 52, which is the surface commonly pushed by an operator to move the button. The top surface 52 is generally planar in the illustrated embodiment and is typically horizontally oriented when the container 12 is resting on a horizontal surface in typical use. The button 30 includes a peripheral skirt 54 that extends downwardly from a periphery of the upper section 50. The peripheral skirt 54 is generally annular, or cylindrical, in configuration and is vertical in the illustrated embodiment when the container 12 is resting on a horizontal surface in typical use. Tabs 56 (four of which are shown in the illustrated embodiment) extend radially outwardly from a lower free end of the peripheral skirt 54. The tabs 56 facilitate connecting the button 30 with the top lid 32. With reference to FIG. 5, the button 30 includes an inner annular flange 58 extending downwardly from the upper section 50 and offset radially inwardly from the peripheral skirt 54. The button 30 further includes a barb 60, which is centrally located, and extends downwardly from the upper section 50. The barb 60 includes a cross-shaped base 62 and is provided for connecting the button 30 with the cam mechanism 36.

The top lid 32 includes a generally horizontally disposed upper section 70 that defines an upper surface 72 of the lid 14. The upper surface 72 is generally planar in the illustrated embodiment and is typically horizontally oriented when the container 12 is resting on a horizontal support surface, e.g. a table, and the lid 14 is covering the upper opening 22 (FIG. 2) of the container 12. A button hole 74 is provided in the top lid 32 for receiving the button 30. The button hole 74 in the illustrated embodiment is circular since the button 30 is also circular; however, the button hole 74 could take other shapes especially where the button is shaped differently. Appendages 76 depend downwardly from the upper section 70 near the button hole 74. Four appendages 76 are shown in the illustrated embodiment (see FIG. 5). Each appendage 76 includes a respective channel 78 for receiving a respective tab 56 on the button 30. The tabs 56 move within the channel 78 when the button 30 is depressed and released. The tabs 56 riding in the channels 78 prevent rotational movement of the button 30 with respect to the top lid 32. The top lid 32 also includes fastener openings 82 that extend through standoffs 84 (FIG. 5) to facilitate attachment of the top lid 32 with the base 38. The top lid 32 also includes a vertically oriented peripheral skirt 86 that depends downwardly from a periphery of the upper section 70. The peripheral skirt 86 generally matches the configuration of the side wall 16 of the container 12. An internal vertical wall 88 depends downwardly from the upper section 70 and is offset inwardly from the peripheral skirt 86. The internal vertical wall 88 is the same shape as the peripheral skirt 86, but is smaller. A channel 92 is formed between the peripheral skirt 86 and the internal vertical wall 88. At least a portion of the gasket 40 is received in this channel 92, which is visible in FIG. 4.

With reference to FIG. 3, the web 34 is an integrally formed piece of plastic material including a hub 100, arms 102, gasket pushers 104, and tensile connector elements 106. Each arm 102 connects the hub 100 with a respective gasket pusher 104. Each tensile connector element 106 connects a respective gasket pusher 104 with an adjacent gasket pusher. Movement of the button 30 results in movement of the hub 100, which results in movement of the arms 102, which results in movement of the gasket pushers 104, which results in movement of the gasket 40.

The hub 100 includes a central opening 110 that receives the barb 60 on the button 30. The cross-shaped base 62 fits into the central opening 110 in the hub 100 in a manner to prevent rotation of the button 30 with respect to the hub 100. The hub includes ratchet teeth 112 (shown in cross section in FIG. 4) that cooperate with the cam mechanism 36. The barb 60 connects with the cam mechanism 36, which operatively connects the button 30 with the hub 100.

The arms 102 extend radially outwardly from a lower end of the hub 100 and connect the hub 100 with the respective gasket pushers 104. Centerlines bisecting each arm 102 are offset 90 degrees from each other, and each centerline passes through a center of the hub 100. Each arm 102 includes a first hinge section 120 connecting the arm 102 with the hub 100 and second hinge section 122 connecting a respective gasket pusher 104 with the arm 102. Each hinge section 120 and 122 operates as a flexure. Each hinge section 120 and 122 has a thickness that is smaller as compared to the section of each arm 102 between the hinge sections. As more clearly seen in FIG. 4, for the first hinge section 120 material has been removed from a lower section the arm 102, and for the second hinge section 122 material has been removed from an upper section the arm. In an alternative arrangement, material could be removed from the lower section of the arm 102 or from the upper section of the arm for both the first hinge section 120 and the second hinge section 122. Each arm also includes an elongate hole 126. The elongate hole 126 is positioned between the first hinge section 120 and the second hinge section 122. The elongate hole 126 provides a locating feature for the arm 102 and the web 34, and also can limit movement of the arm.

Figure 11:
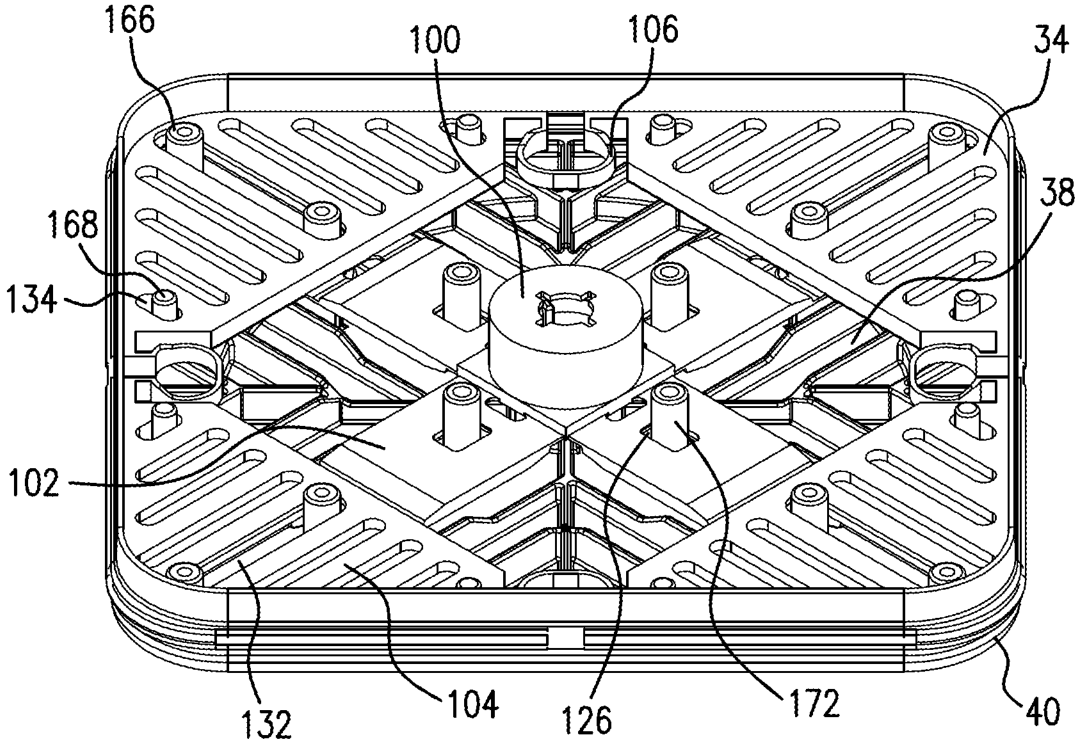
FIGS. 11 and 12 are a perspective and plan view, respectively, showing the web, the base and the gasket of the lid in a position where the button would be in the depressed (and locked) position.
Figure 12:
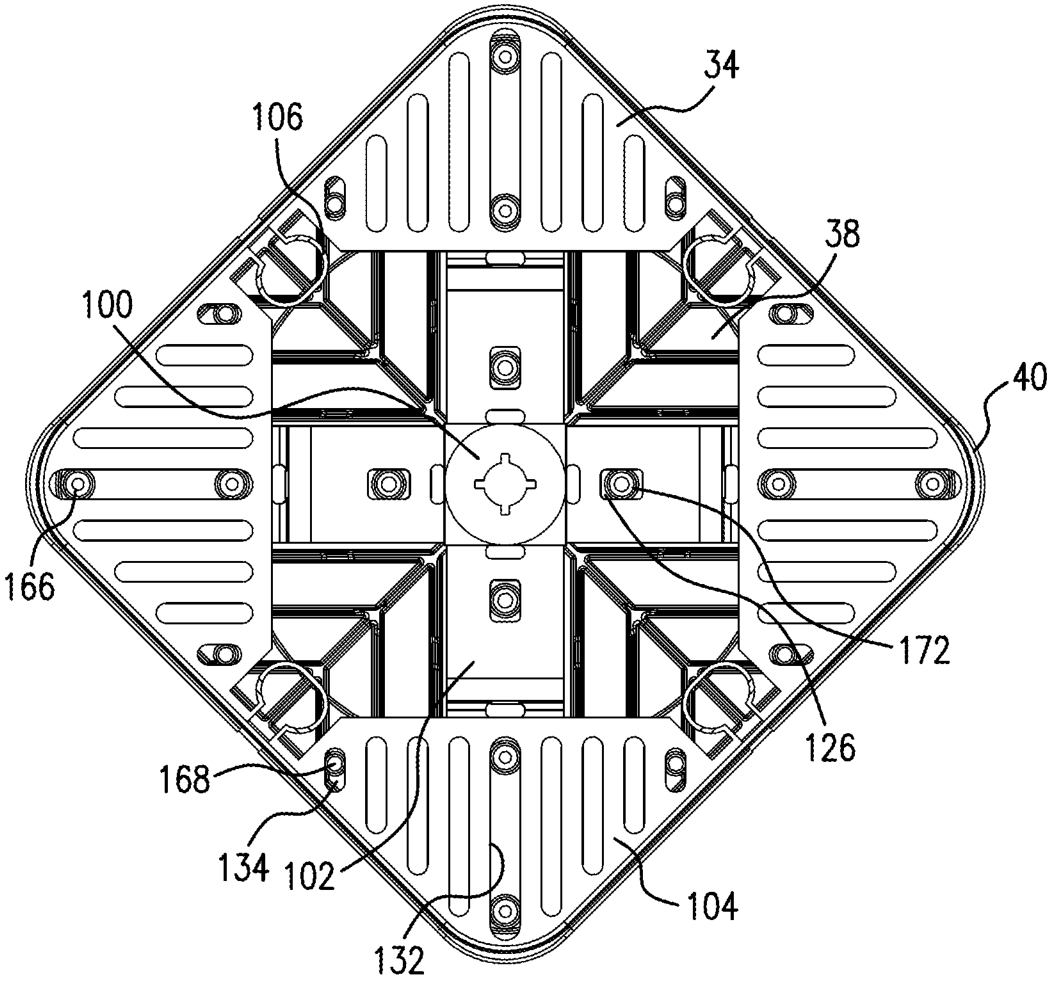

Each gasket pusher 104 is generally triangular in the plan view. Each gasket pusher 104 includes a gasket contact surface 130 that contacts the gasket 40. In the illustrated embodiment, each gasket contact surface 130 is generally L-shaped in plan view and line emanating from a center point of the hub 100 bisecting the arm 102 is coincident with a corner of the L-shaped gasket contact surface 130. Each gasket pusher 104 includes a central elongate opening 132 that is centered along the line emanating from a center point of the hub 100 bisecting the arm 102. Each gasket pusher 104 also includes outer gasket pusher openings 134 adjacent each respective tensile connector element 106 connected with the gasket pusher 104. The openings 132, 134 in the gasket pusher 104 provide a locating feature for the gasket pusher 104 and the web 34, and also can limit movement of the gasket pusher. The web 34 on each gasket pusher 104 includes a flat (planar) upper surface 136 and a flat (planar) lower surface 138, both of which are normal to the first axial direction (parallel to arrow 42 in FIG. 4). The gasket pusher 104 and the second hinge section 122 move in a plane parallel with either the upper surface 136 or the lower surface 138 to expand and to contract the gasket 40. The gasket pusher 104 is movable between a retracted position (see FIGS. 7 and 8) and an extended position (FIGS. 11 and 12). The gasket pusher 104 pushes the gasket 40 toward the expanded state when moving from the retracted position toward the extended position.

The tensile connector elements 106 interconnect adjacent gasket pushers 104. In the illustrated embodiment, four gasket pushers 104 are provided and interconnected by four tensile connector elements 106. In the illustrated embodiment, the tensile connector elements 106 are ring-shaped. When the gasket pushers 104 are in the extended position, the tensile connector elements 106 are tension urging the gasket pushers back toward the retracted position. The cam mechanism 36, however, maintains the gasket pushers 104 in the extended position until the button 30 is pushed again after the button 30 is in the depressed position.

In the illustrated embodiment, the web 34 is formed of a single piece of plastic material so that the hub 100 is interconnected with the gasket pushers 104 through the respective arms 102, and the gasket pushers 104 are also interconnected by the respective tensile connector elements 106. When molding the web 34, the web 34 is molded in the configuration shown in FIG. 3 where a lower end of the hub 100 is offset vertically above the upper surface 136 and the lower surface 138. This results in the web 34 tending to be urged toward this position as compared to the position in which the lower end of the hub 100 is co-planar with the lower surface 138.

The cam mechanism 36 includes a cam 140 and a spring 142 that acts against the base 38 to bias the cam 140 toward the button 30. The cam 140 includes a cylindrical body 144 having vertical channels 146 and ratchet teeth 148. The cam 140 connects with the button 30 through the barb 60 being inserted into an opening 152 in the cam 140 (FIG. 4). The spring 142 biases the button 30 toward the projected position (FIG. 1).

The base 38 is formed of a plate 160 having an upper surface 162 facing toward the top lid 32 and a lower surface 164 (FIG. 5) that faces toward the inner volume 20 of the container 12 when the lid 14 is on the container. As seen in FIG. 3, central gasket pusher standoffs 166 are received in the central elongate openings 132 provided in each gasket pusher 104. Outer gasket pusher standoffs 168 extend upwardly from the upper surface 162 and are received in the outer gasket pusher openings 134. Arm standoffs 172 extend upwardly from the upper surface 162 and are received in the respective elongate holes 126 provided in each arm 102. The standoffs 166, 168 and 172 aid in locating the web 34 on the base 38. Each of the central gasket pusher standoffs 166 in each respective corner of the base 38 can also align with the standoffs 84 in the top lid 32 to receive fasteners to connect the top lid 32 with the base 38. The top lid 32 can connect with the base 38 in other conventional manners. The standoffs 166, 168 and 172 are shown as extending upwardly from the base 38; however, if desired, the standoffs could extend downwardly from the upper section 70 of the top lid 32.

Figure 6:
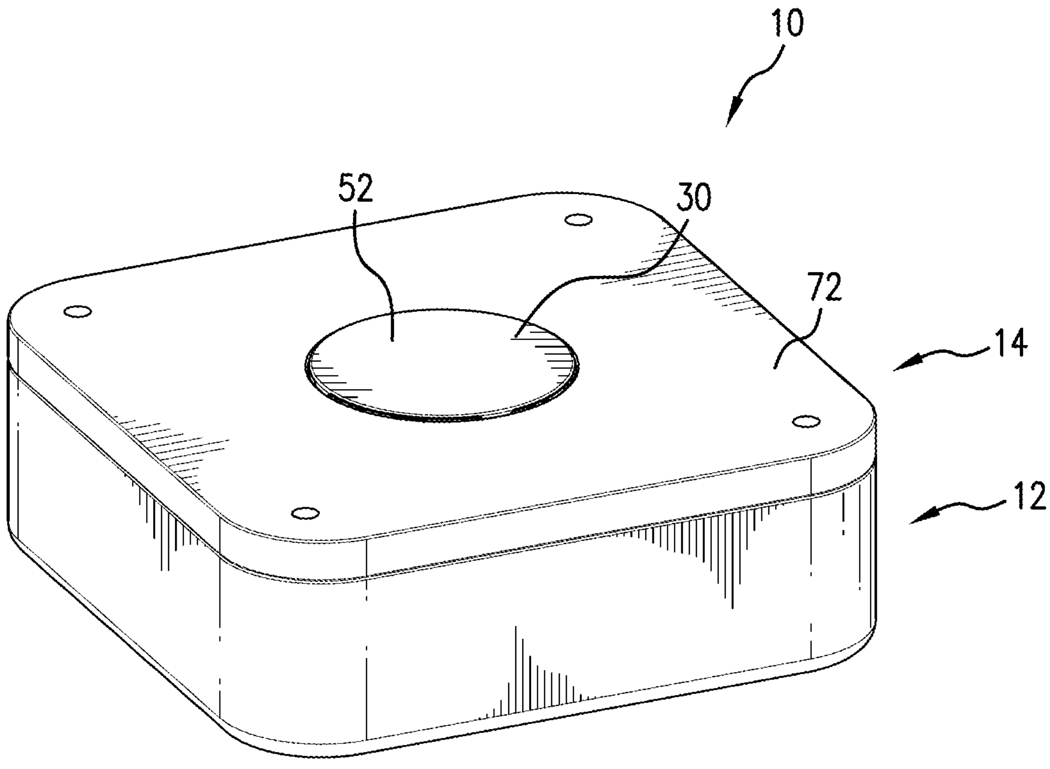
FIG. 6 is a perspective view of the container assembly with the button in a depressed (and locked) position.

The base 38 further includes a central annular boss 174 having inwardly extending projections 176 that terminate above slots 178 extending radially through the central annular boss 174. The cam mechanism 36 is received in the central annular boss 174 and the vertical channels 146 cooperate with the projections 176 in a known manner so that the button 30 is stable in an projected position in which the top surface 52 of the button is offset from the upper surface 72 of the lid 14 (shown in FIG. 1) and in a depressed position in which the top surface 52 of the button 30 is nearer to the upper surface 72 of the lid 14 as compared to the projected position. It is desirable that the top surface 52 of the button 30 is substantially flush with the upper surface 72 of the lid 14 when the button 30 is in the depressed position (see FIG. 6). The ratchet teeth 112 (FIG. 4) on the hub 100 cooperate with the ratchet teeth 148 on the cam 140 in a manner similar to a known ballpoint pen mechanism, which allows the button to maintain one of the projected position and the depressed position.

With reference to FIG. 5, a circular channel 182 is provided in the lower surface 164 of the plate 160, which makes up the base 38. Inlets 184 extend inwardly from the channel 182 toward a center of the plate 160.

The gasket 40 includes a base 190 having an opening 192 and a plurality of inwardly extending ears 194. With reference to FIG. 3, an annular flange 196 extends upwardly from an upper surface 198 of the base 190. The annular flange 196 is received in the channel 182 formed in the base 38 and each ear 194 is received in a respective inlet 184. The gasket 40 also includes a peripheral section 200 that is generally vertically oriented. The gasket 40 includes an inner surface 202 that fits around the base 38 and the web 34.

The button 30 is moveable in a first axial direction (parallel with arrow 42 in FIG. 4) with respect to the top lid 32 between an projected position (shown in FIG. 2) and a depressed position where the top surface 52 of the button 30 would be flush with the upper surface 72 of the lid 14. Because of the cam mechanism 36 being similar to a known ballpoint pen mechanism and the connection between the cam mechanism 36 and the button 30, the button 30 can remain in the depressed position until pressed again, at which time the spring 142 would bias the button 30 from the depressed position toward the projected position. Movement of the button 30 from the projected position toward the depressed position results in pivotal movement of at least one of the arms 102 (each arm in the illustrated embodiment). Each arm 102 pivots about both the first hinge section 120 and the second hinge section 122 as the button 30 is being depressed. The first hinge section 120 of each arm 102 also translates in a downward (per the orientation shown in FIG. 4) direction parallel with the first axial direction. The second hinge section 122 of each arm 102 also translates in a plane normal to the first axial direction away from the hub 100. This movement in each arm 102 results in the gasket pusher 104 moving in a second axial direction, which is transverse to the first axial direction. In the illustrated embodiment, the second axial direction is parallel with arrow 44 in FIG. 4 and perpendicular to the first axial direction; however, the second axial direction need not be perpendicular to the first axial direction but instead at any angle other than parallel to the first axial direction. Movement of the gasket pusher from the retracted position toward the extended position results in the gasket 40 moving toward an expanded state where the gasket 40 can contact the inner surface 24 of the container 12. With the button 30 in the depressed state, the gasket 40 is in contact with the inner surface 24 of the container 12 to seal the container. With the button 30 in the depressed state, the button 30 can be pressed again and the cam mechanism 36 can operate so that the spring 142 biases the button 30 toward the projected position. As the button 30 moves from the depressed position toward the projected position, each arm pivots at both the first hinge section 120 and the second hinge section 122 as the hub 100 moves upwardly with the button 30. The first hinge section 120 of each arm 102 also translates in an upward (per the orientation shown in FIG. 4) direction parallel with the first axial direction. The second hinge section 122 of each arm 102 also translates in a plane normal to the first axial direction toward the hub 100. This results in the gasket pushers 104 being drawn toward the hub so that the gasket 40 no longer engages the inner surface 24 of the container 12.

Figure 7:
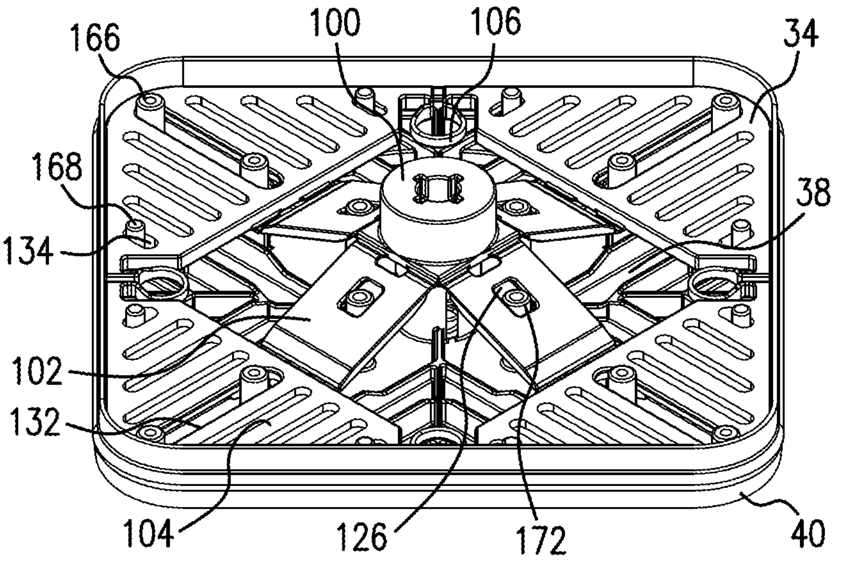
FIGS. 7 and 8 are a perspective and plan view, respectively, showing a web, a base and a gasket of the lid in a position where a button of the lid would be in a projected position.
Figure 8:
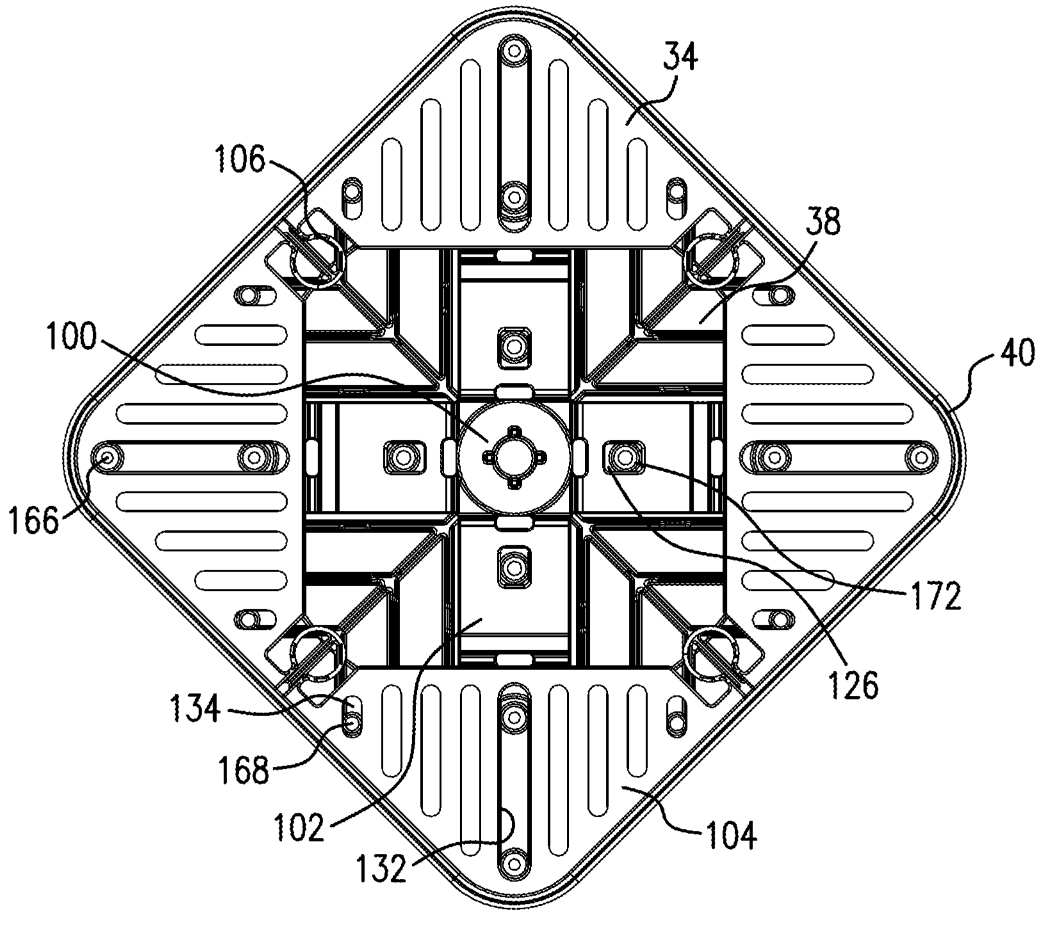
Figure 9:
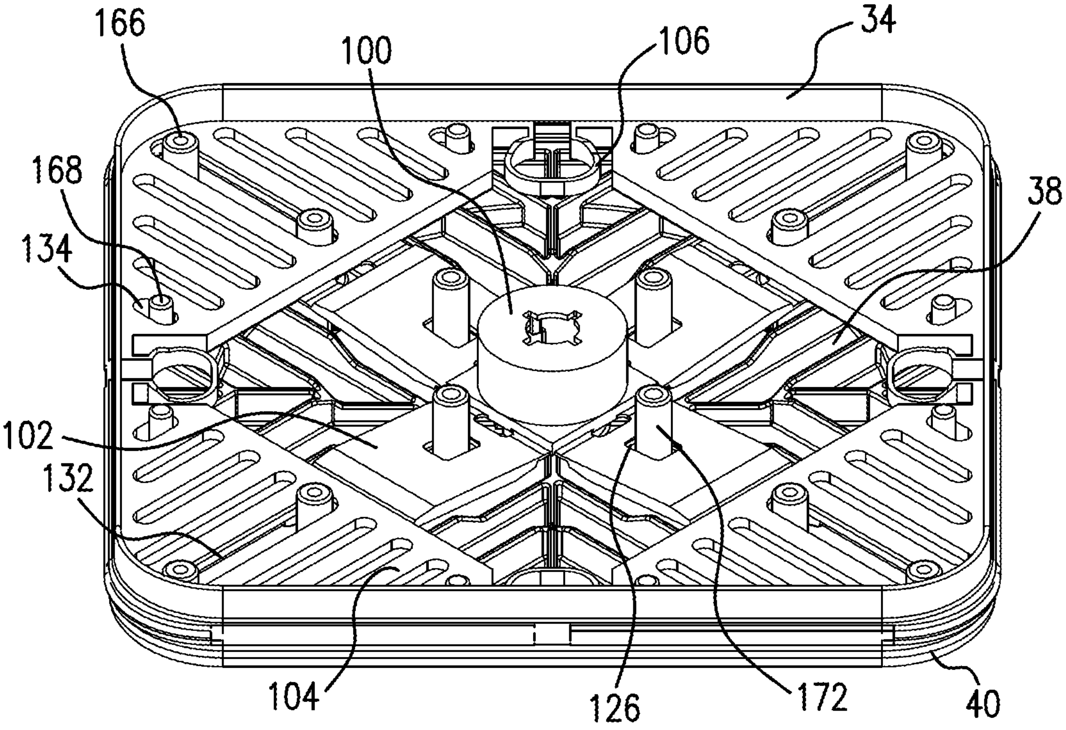
FIGS. 9 and 10 are a perspective and plan view, respectively, showing the web, the base and the gasket of the lid in a position where the button of the lid has been pressed fully downward beyond the depressed position.
Figure 10:
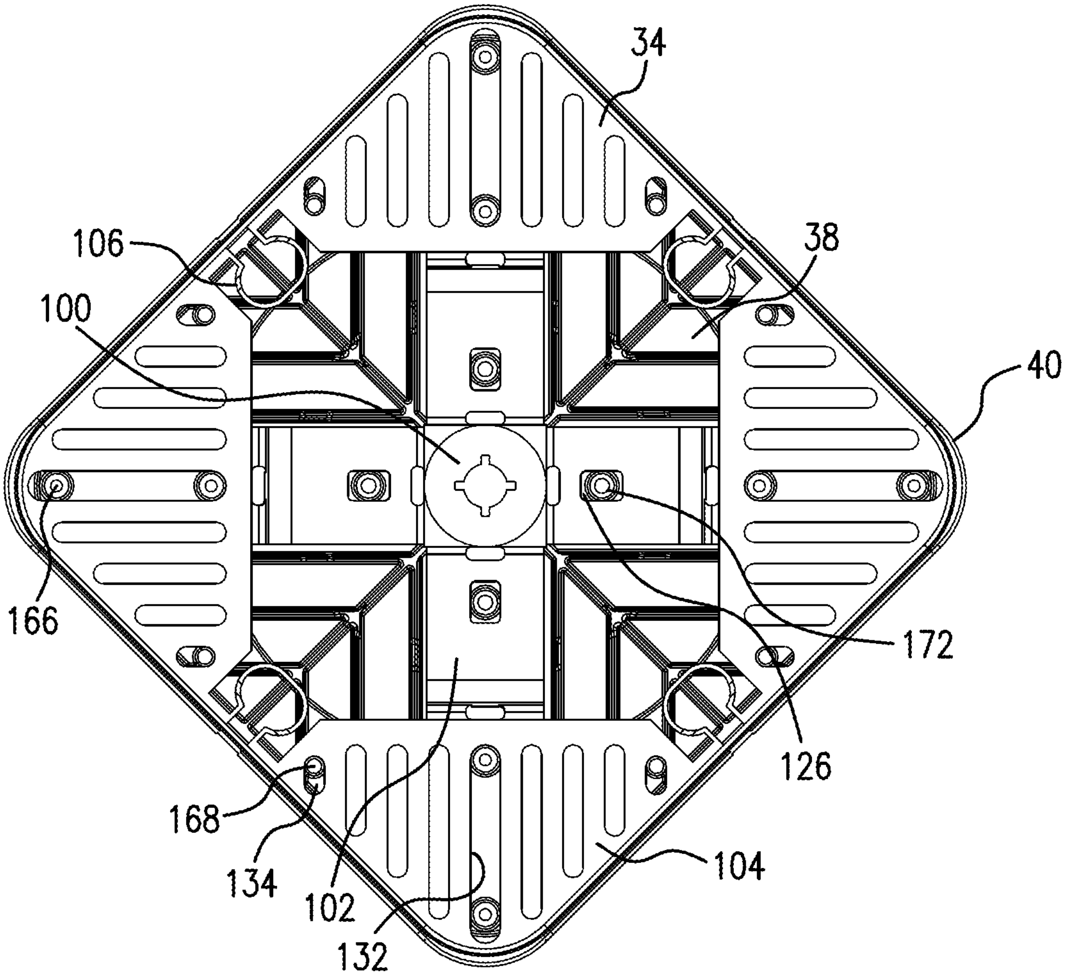

FIGS. 7 and 8 show the web 34, the base 38 and the gasket 40 in a state where the button would be in the projected position. FIGS. 9 and 10 depict the web 34, the base 38 and the gasket 40 in a position where the button 30 would be fully depressed prior to moving into the stable depressed position. FIGS. 11 and 12 depict the web 34, the base 38 and the gasket 40 in a position in which the button is in the depressed position. To move back to the projected position, the button 30 is pressed again, i.e., the button 30 is pressed when in the stable (locked) depressed position.

FIGS. 13-17 depict a lid 214 that is similar to the lid 14. The lid 214 covers an opening of a container similar to the upper opening 22 shown in FIG. 2, but the container would be a different shape. The lid 214 can seal against the inner surface (similar to the inner surface 24 in FIG. 2) of such a container.

Figure 13:
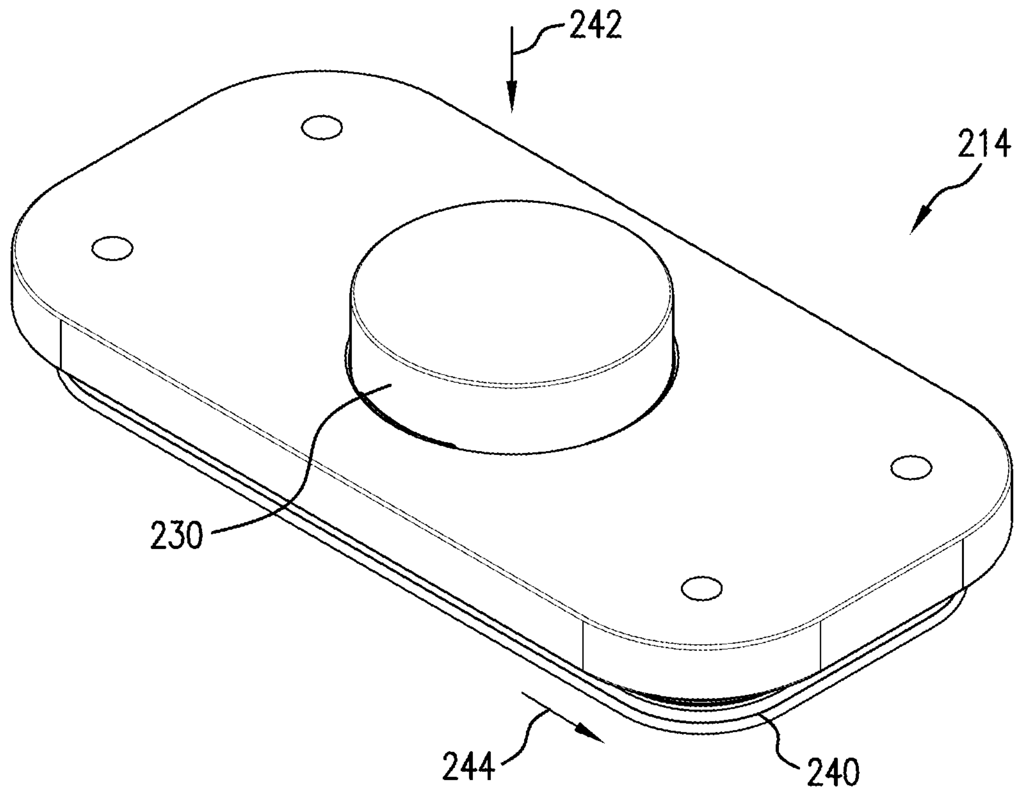
FIG. 13 is a perspective view of another embodiment of a lid that is able to seal with a container.
Figure 14:
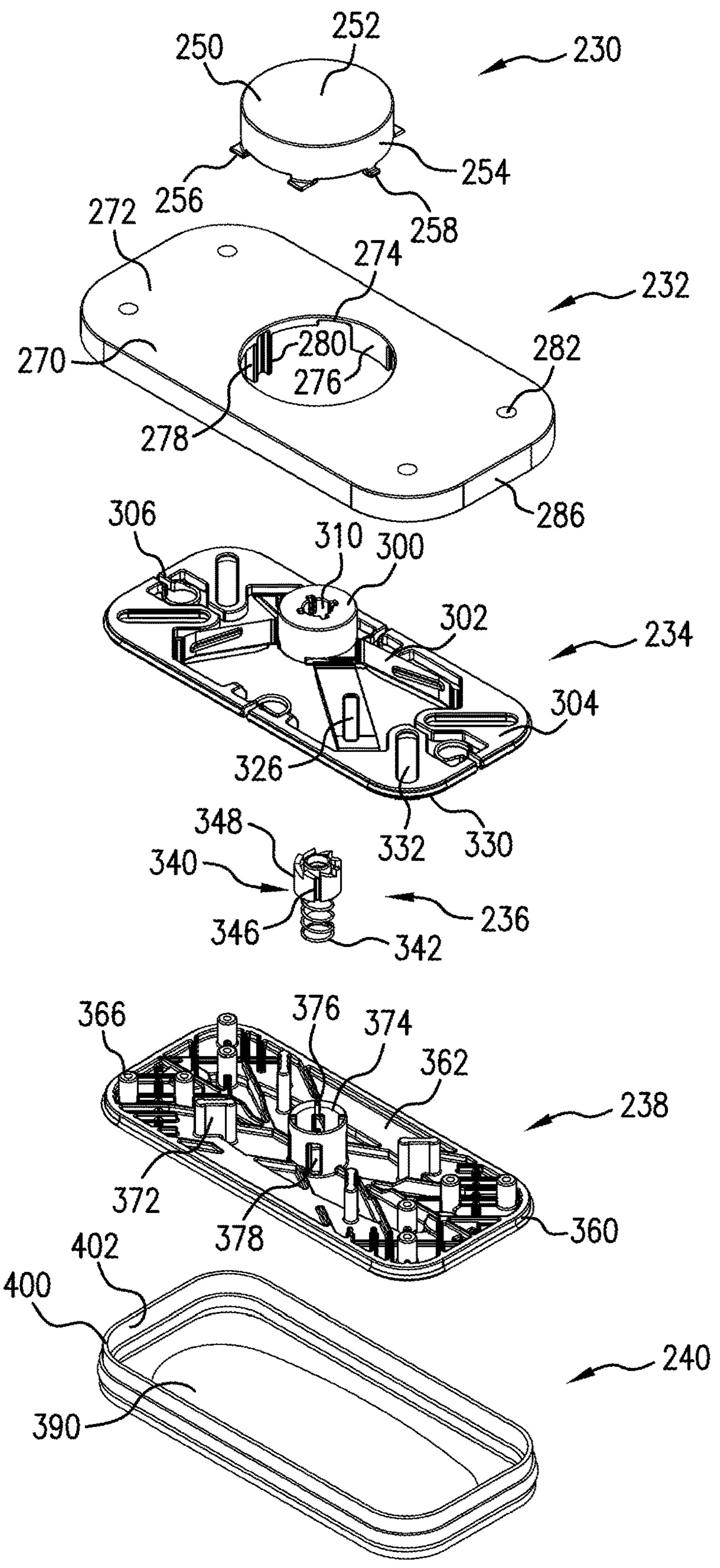
FIG. 14 is an exploded view of the lid depicted in FIG. 13.
Figure 15:
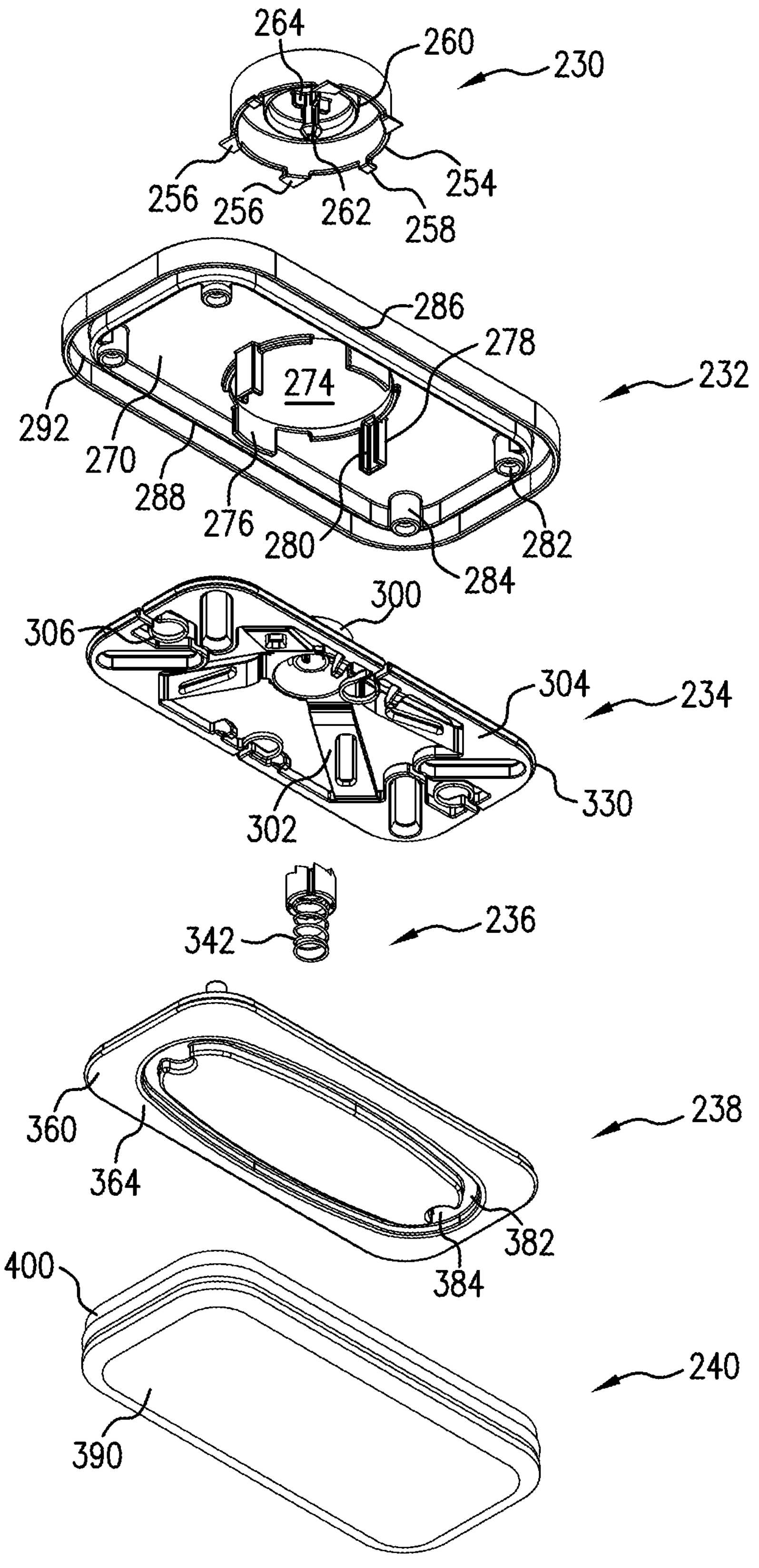
FIG. 15 is an exploded view of the lid depicted in FIG. 13 from a different (lower) perspective than that shown in FIG. 14.
Figure 16:
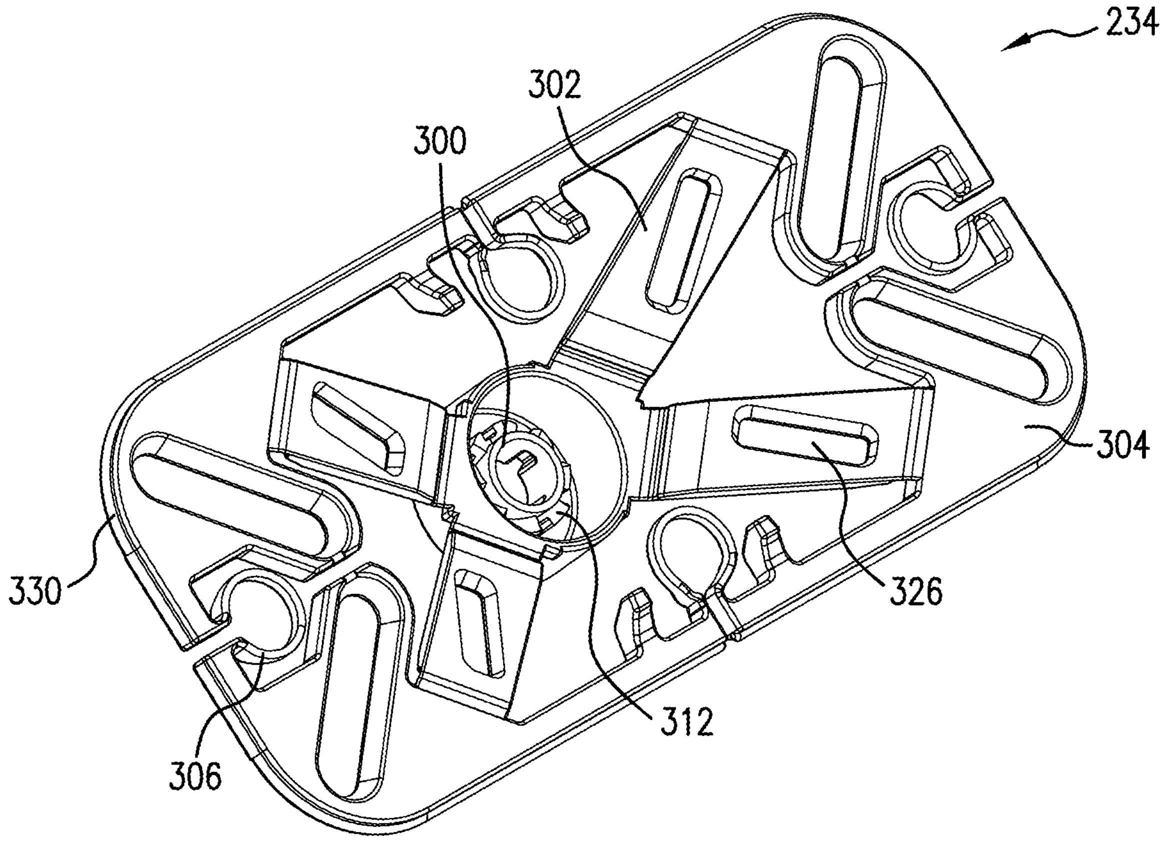
FIG. 16 is a lower perspective view of a web of the lid depicted in FIG. 13.

FIGS. 14 and 15 depict an exploded view of the lid 214 shown in FIG. 13. The lid 214 includes a button 230, a top lid 232, a web 234, a cam mechanism 236, a base 238, and a gasket 240. With reference to FIG. 13, movement of the button 230 in a first axial direction, e.g. parallel with arrow 242, results in movement of the gasket 240 in a second axial direction, e.g. parallel with arrow 244, which is perpendicular to the first axial direction. Actuation of the button 230 moves the gasket 240 from a contracted state (shown in FIG. 13) toward an expanded state in which the gasket 240 would contact the inner surface of a container.

The button 230 is shown as generally circular in configuration, but the button could take other configurations such as square, rectangular, or other polygonal configurations. The button 230 includes an upper section 250 defining a top surface 252, which is the surface commonly pushed by an operator to move the button. The button 230 includes a peripheral skirt 254 that extends downwardly from a periphery of the upper section 250. Different that the button 30, for the button 230 female tabs 256 (four of which are shown in the illustrated embodiment) extend outwardly from a lower free end of the peripheral skirt 254. Male tabs 258 extend outwardly from a lower free end of the peripheral skirt 254. Two male tabs 258 are shown disposed 180 degrees from one another, and offset 90 degrees from a respective pair of female tabs 256. The tabs 256, 258 facilitate connecting the button 230 with the top lid 232. With reference to FIG. 15, the button 230 includes an inner annular flange 260 extending downwardly from the upper section 250 and offset radially inwardly from the peripheral skirt 254. The button 230 further includes a barb 262 extending downwardly from the upper section 250. The barb 262 includes a cross-shaped base 264 and is provided for connecting the button 230 with the cam mechanism 236.

The top lid 232 includes a generally horizontally disposed upper section 270 that defines an upper surface 272 of the lid 214. A button hole 274 is provided in the top lid 232 for receiving the button 230. First (wider) appendages 276 depend downwardly from the upper section 270 near the button hole 274. The first appendages 276 are received between the female tabs 256. Two first appendages 276 are shown in the illustrated embodiment (see FIG. 15). Second (thinner) appendages 278 depend downwardly from the upper section 270 near the button hole 274. Each second appendage 278 includes a respective channel 280 for receiving a respective male tab 258 on the button 230. The tabs 256, 258 cooperate with the appendages 276, 278 to prevent rotational movement of the button 230 with respect to the top lid 232. The top lid 232 also includes fastener openings 282 that extend through standoffs 284 (FIG. 15) to facilitate attachment of the top lid 232 with the base 238. The top lid 232 also includes a vertically oriented peripheral skirt 286 that depends downwardly from a periphery of the upper section 270. The peripheral skirt 286 generally matches the configuration of the side wall of the container that the lid 214 will cooperate with. An internal vertical wall 288 depends downwardly from the upper section 270 and is offset inwardly from the peripheral skirt 286. The internal vertical wall 288 is the same shape as, but smaller than, the peripheral skirt 286. A channel 292 is formed between the peripheral skirt 286 and the internal vertical wall 288. At least a portion of the gasket 240 is received in this channel 292, similar to the gasket 40 being received in the channel 92 as shown in FIG. 4.

With reference to FIG. 14, the web 234 is an integrally formed piece of plastic material including a hub 300, arms 302, gasket pushers 304, and tensile connector elements 306. Each arm 302 connects the hub 300 with a respective gasket pusher 304. Each tensile connector element 306 connects a respective gasket pusher 304 with an adjacent gasket pusher. Movement of the button 230 results in movement of the hub 300, which results in movement of the arms 302, which results in movement of the gasket pushers 304, which results in movement of the gasket 240.

The hub 300 includes a central opening 310 that receives the barb 262 on the button 230. The cross-shaped base 264 fits into the opening 310 in the hub 300 in a manner to prevent rotation of the button 230 with respect to the hub 300. The hub 300 includes ratchet teeth 312 (FIG. 16) that cooperate with the cam mechanism 236. The barb 262 connects with the cam mechanism 236, in a similar manner as the barb 60 connects with the cam mechanism 36, which operatively connects the button 230 with the hub 300.

Figure 18:
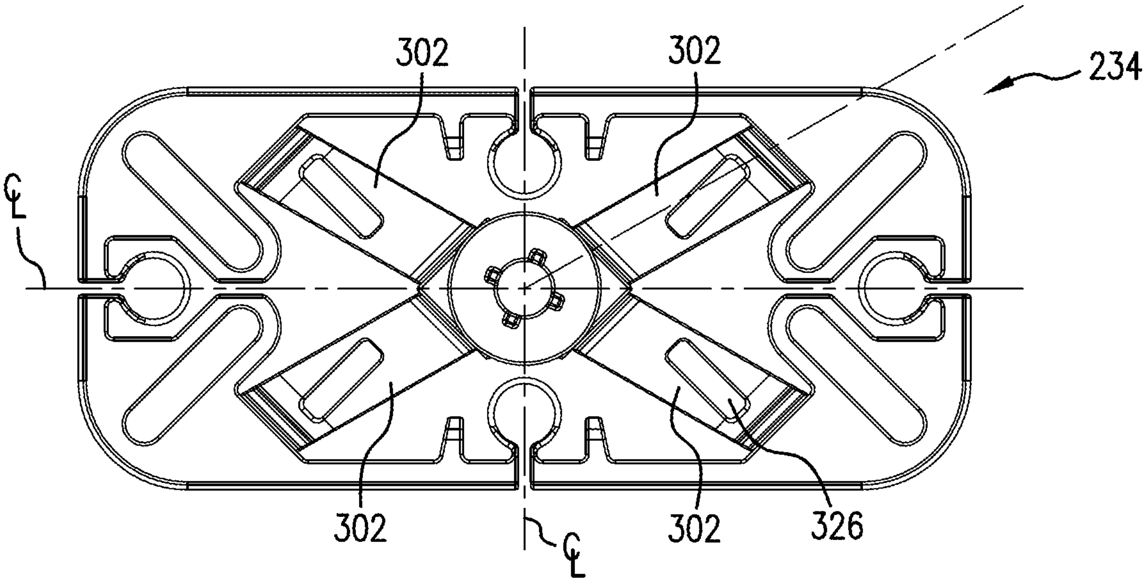
FIG. 18 is a plan view of the web of the lid depicted in FIG. 13.

The arms 302 extend outwardly from a lower end of the hub 300 and connect the hub 300 with the respective gasket pushers 304. The arms 302 are not angularly spaced from each other in the same manner as the web 34 described above. When viewed in a top plan view (see FIG. 18), the arms 302 on the left side a vertical center line of the web 234 (disregard the orientation of the opening 310) are angularly spaced at an acute angle from each other. Likewise, the arms 302 on the right side of the centerline are angularly spaced at an acute angle from each other. In contrast, the arms 302 located above the horizontal center line in FIG. 18 are angularly spaced at an obtuse angle from each other. Similarly, the arms 302 located below the horizontal center line in FIG. 18 are angularly spaced at an obtuse angle from each other.

Figure 17:
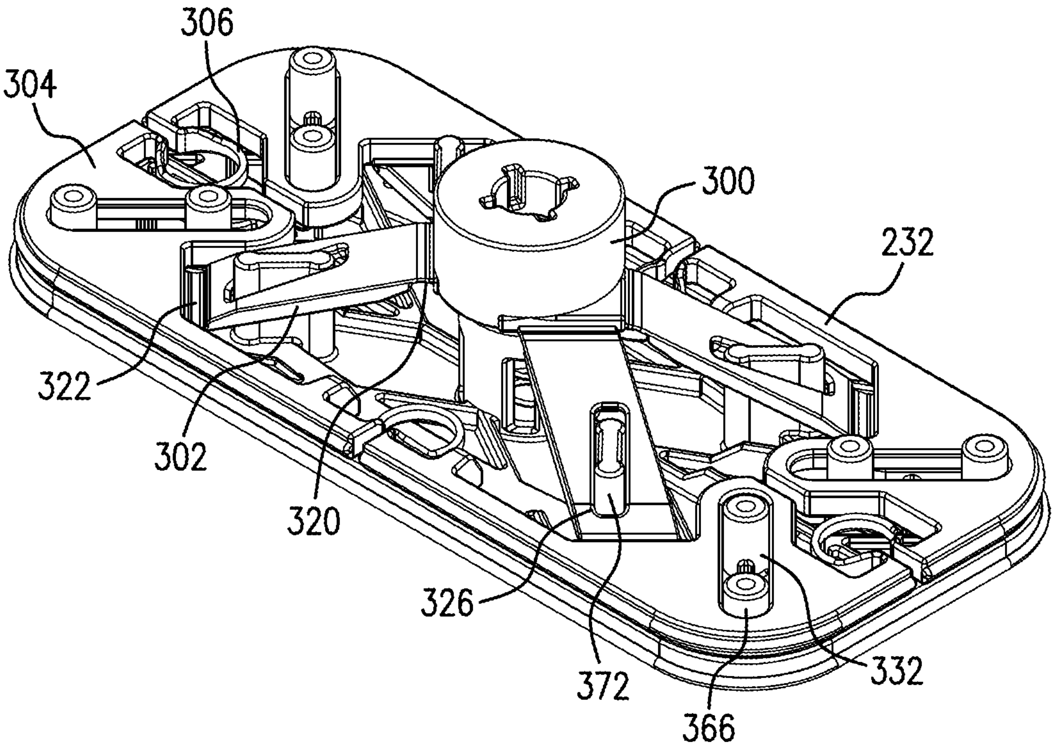
FIG. 17 is a perspective view showing a web, a base and a gasket of the lid in FIG. 13 in a position where a button of the lid would be in a projected position.

With reference to FIG. 17, each arm 302 includes a first (proximal) hinge section 320 connecting the arm 302 with the hub 300 and second (distal) hinge section 322 connecting a respective gasket pusher 304 with the arm 302. Each hinge section 320 and 322 operates as a flexure. Each hinge section 320 and 322 has a thickness that is smaller as compared to the section of each arm 302 between the hinge sections. For the first hinge section 320, material has been removed from underneath the arm 302. For the second hinge section 322, material has been removed from above the arm 302. Each hinge section 320, 322 could be formed in the same manner, e.g., both could have material removed from an upper section or both could have material removed from a lower section. Each arm 302 also includes an elongate hole 326. The elongate hole 326 is positioned between the first hinge section 320 and the second hinge section 322. The elongate hole 326 provides a locating feature for the arm 302 and the web 234, and also can limit movement of the arm.

Each gasket pusher 304 includes a gasket contact surface 330 that contacts the gasket 240. In the illustrated embodiment, each gasket contact surface 330 is generally L-shaped in plan view. Because of the rectangular configuration of the lid 214, however, a line emanating from a center point of the hub 300 bisecting the arm 302 is offset from a corner of the L-shaped gasket contact surface 330 (see FIG. 18).

Each gasket pusher 304 includes an elongate opening 332 that is similar to the opening 132 in the gasket pusher 104 to provide a locating feature for the gasket pusher 304 and the web 234, and also to limit movement of the gasket pusher. The web 234 includes a flat (planar) upper surface 336 and a flat (planar) lower surface 338. The gasket pusher 304 and the second hinge section 322 move in a plane parallel with either the upper surface 336 or the lower surface 338 to expand and contract the gasket 240. The gasket pusher 304 is movable between a retracted position and an extended position. The gasket pusher 304 pushes the gasket 240 toward the expanded state when moving from the retracted position toward the extended position.

The tensile connector elements 306 interconnect adjacent gasket pushers 304. In the illustrated embodiment, four gasket pushers 304 are provided and interconnected by four tensile connector elements 306. In the illustrated embodiment, the tensile connector elements 306 are ring-shaped. When the gasket pushers 304 are in the extended position, the tensile connector elements 306 are tension urging the gasket pushers back toward the retracted position. The cam mechanism 236, however, maintains the gasket pushers 304 in the extended position until the button 230 is pushed again after the button 230 is in the depressed position.

In the illustrated embodiment, the web 234 is formed of a single piece of plastic material so that the hub 300 is interconnected with the gasket pushers 304 through the respective arms 302, and the gasket pushers 304 are also interconnected by the respective tensile connector elements 306. The web 234 is molded in the position shown in FIG. 14.

The cam mechanism 236 is identical in all respects as the cam mechanism 36. As such, further description has been omitted.

The base 238 is formed of a plate 360 having an upper surface 362 facing toward the top lid 32 and a lower surface 364 (FIG. 15) that faces toward the inner volume of the container when the lid is on the container. With reference to FIG. 17, gasket pusher standoffs 366 extend upwardly from the upper surface 362 and are received in the elongate openings 332 provided in each gasket pusher 304. Arm standoffs 372 extend upwardly from the upper surface 362 and are received in the respective elongate holes 326 provided in each arm 302. The standoffs 366 and 372 aid in locating the web 234 on the base 238. Each of the gasket pusher standoffs 366 in each respective corner of the base 238 can also align with the standoffs 284 in the top lid 232 to receive fasteners to connect the top lid 232 with the base 238. The top lid 232 can connect with the base 238 in other conventional manners. The standoffs 366 and 372 are shown as extending upwardly from the base 238; however, if desired, the standoffs could extend downwardly from the upper section 270 of the top lid 232.

The base 238 further includes a central annular boss 374 having inwardly extending projections 376 that terminate above slots 378 extending radially through the central annular boss 374. The cam mechanism 236 is received in the central annular boss 374 and the vertical channels 346 cooperate with the projections 376 in a known manner so that the button 230 is stable in an projected position in which the top surface 252 of the button is offset from the upper surface 272 of the lid 214 (shown in FIG. 13) and in a depressed position in which the top surface 252 of the button 230 is nearer to the upper surface 272 of the lid 214 as compared to the projected position. The top surface 252 of the button 230 can be substantially flush with the upper surface 272 of the lid 214 when the button 230 is in the depressed position. The ratchet teeth 312 (FIG. 16) on the hub 300 cooperate with the ratchet teeth 348 on the cam 340 in a manner similar to a known ballpoint pen mechanism, which allows the button to maintain one of the projected position and the depressed position.

With reference to FIG. 15, a channel 382 is provided in the lower surface 364 of the plate 360, which makes up the base 238. Inlets 384 extend inwardly from the channel 382 toward a center of the plate 360.

The gasket 240 includes a base 390 and a peripheral section 400 that is generally vertically oriented. The gasket 240 includes an inner surface 402 that fits around the base 238 and the web 234.

The button 230 is moveable in a first axial direction (parallel with arrow 242 in FIG. 13) with respect to the top lid 232 between an projected position (shown in FIG. 13) and a depressed position where the top surface 252 of the button 230 would be flush with the upper surface 272 of the lid 214. Because of the cam mechanism 236 being similar to a known ballpoint pen mechanism and the connection between the cam mechanism 236 and the button 230, the button 230 can remain in the depressed position until pressed again, at which time the spring 342 would bias the button 230 from the depressed position toward the projected position. Movement of the button 230 from the projected position toward the depressed position results in pivotal movement of at least one of the arms 302 (each arm in the illustrated embodiment). Each arm 302 pivots about both the first hinge section 320 and the second hinge section 322 as the button 230 is being depressed. The first hinge section 320 of each arm 302 also translates in a downward direction (per the orientation shown in FIG. 14) parallel with the first axial direction (arrow 242). The second hinge section 322 also translates and moves outwardly away from the hub 300 along a plane normal to the first axial direction. This movement in each arm 302 results in the gasket pusher 304 moving in a second axial direction, which is transverse to the first axial direction. In the illustrated embodiment, the second axial direction is parallel with arrow 244 in FIG. 13 and perpendicular to the first axial direction; however, the second axial direction need not be perpendicular to the first axial direction. Movement of the gasket pusher from the retracted position toward the extended position results in the gasket 240 moving toward an expanded state where the gasket 240 can contact the inner surface of the container. With the button 230 in the depressed state, the gasket 240 is in contact with the inner surface of the container to seal the container. With the button 230 in the depressed state, the button 230 can be pressed again and the cam mechanism 236 can operate so that the spring 342 biases the button 230 toward the projected position. As the button 230 moves from the depressed position toward the projected position, each arm pivots at both the first hinge section 320 and the second hinge section 322 as the hub 300 moves upwardly with the button 230. The first hinge section 320 of each arm 302 also translates in an upward direction (per the orientation shown in FIG. 14) parallel with the first axial direction (arrow 242). The second hinge section 322 also translates and moves inwardly toward the hub 300 along a plane normal to the first axial direction. This results in the gasket pushers 304 being drawn toward the hub 300 so that the gasket 240 no longer engages the inner surface 24 of the container 12. FIG. 17 shows the web 234, the base 238 and the gasket 240 in a state where the button would be in the projected position.

Figure 19:
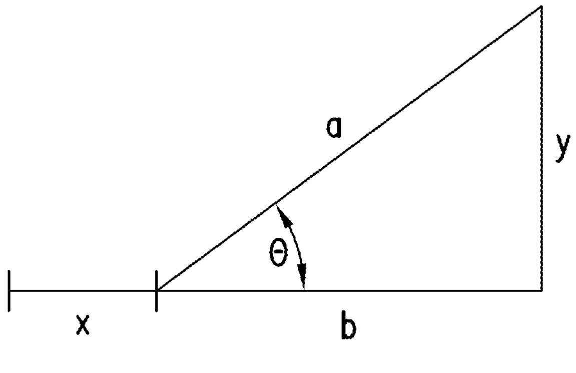
FIG. 19 is a schematic depiction of displacement of an arm on the web and the button of the lid shown in both FIG. 1 and FIG. 13.
Figure 20:
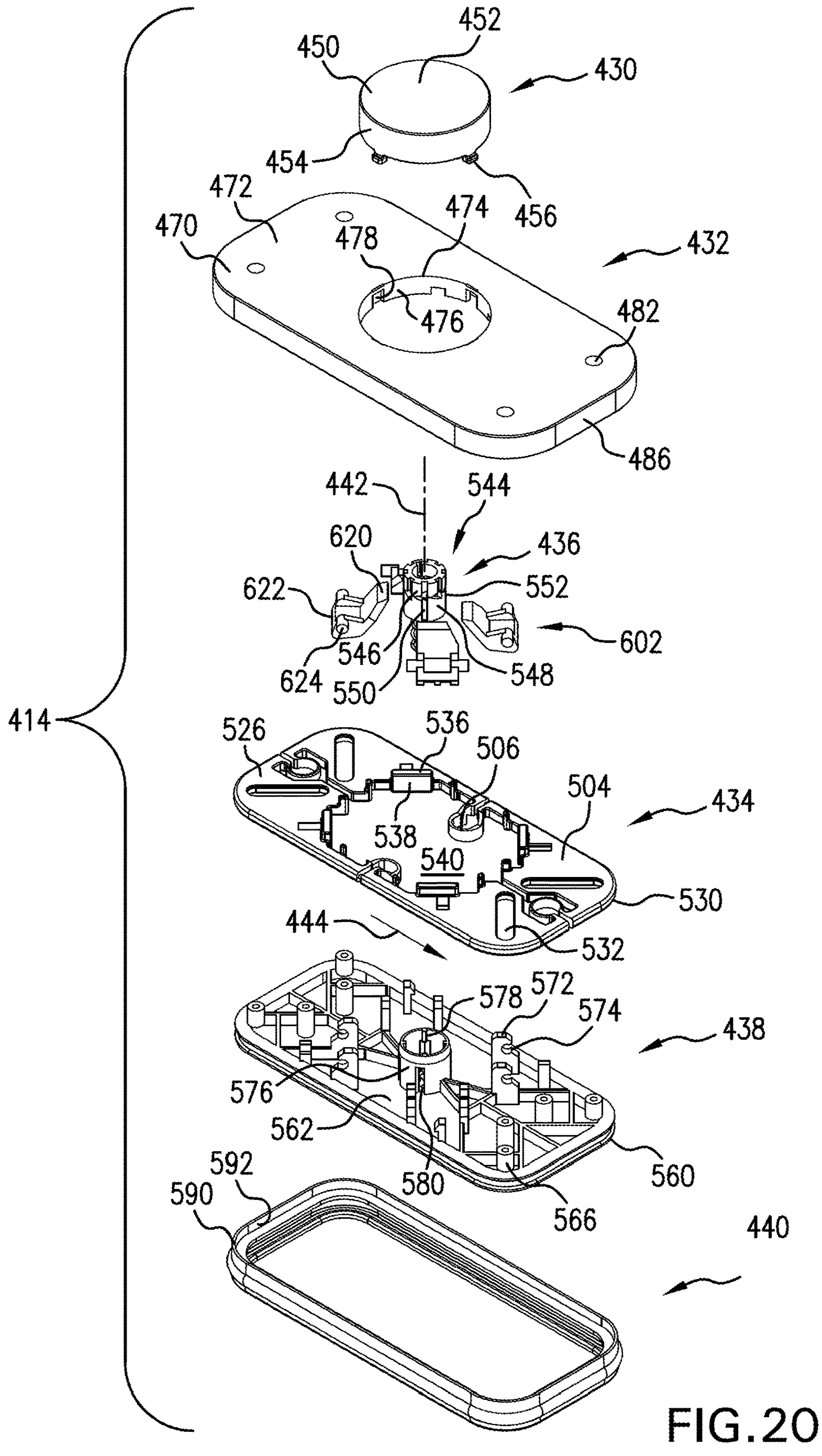
FIG. 20 is an exploded view of another embodiment of a lid.

The lids 14 and 214 described above can be made relatively short in the vertical direction (parallel to arrow 42 in FIG. 4 and a central axis 442 in FIG. 20). FIG. 19 schematically depicts the displacement of the button 30, 230 in the vertical direction as "y" and the displacement of each gasket pusher 104, 304 in the horizontal direction as "x". The length of the arm 102, 302 on the web 34, 234 is "a." It is desirable to have the displacement of the gasket pusher "x" to be less than twice the length of the arm, i.e., x<2a. Also, it is desirable to have the angle θ be less than 45 degrees to that the horizontal force on acting on the gasket pusher 104, 304 has a larger horizontal component as compared to a vertical component.

The lids 12 and 214 can be assembled in an easy manner. A method for assembling the lid 14, 214 includes placing the cam mechanism 36, 236 on the base 38, 238, and placing the web 34, 234 on the base 38, 238. The method further includes connecting the button 30, 230 with the cam mechanism 36, 236, placing the top lid 32, 232 on the base 38, 238 and connecting the base 38, 238 with the top lid 32, 232. The attachment method of the base 38, 238 with the top lid 32, 232 can be using fasteners or via a snap-fit connection. The method further includes attaching the gasket 40, 240 to the base 38, 238, which can be by stretching the gasket 40, 240 around the base 38, 238.

The method for assembling the lid 14, 214 can allow for the easy stacking of components on top of one another, which facilitates the assembly process. The order of the steps described above need not be performed in the exact order described. Moreover, placing the cam mechanism 36, 236 on the base 38, 238 can include inserting the spring 142, 342 into the central annular boss 174, 374 (or onto a differently shaped boss) and placing the cam 140, 340 on the spring 142, 342.

Figure 21:
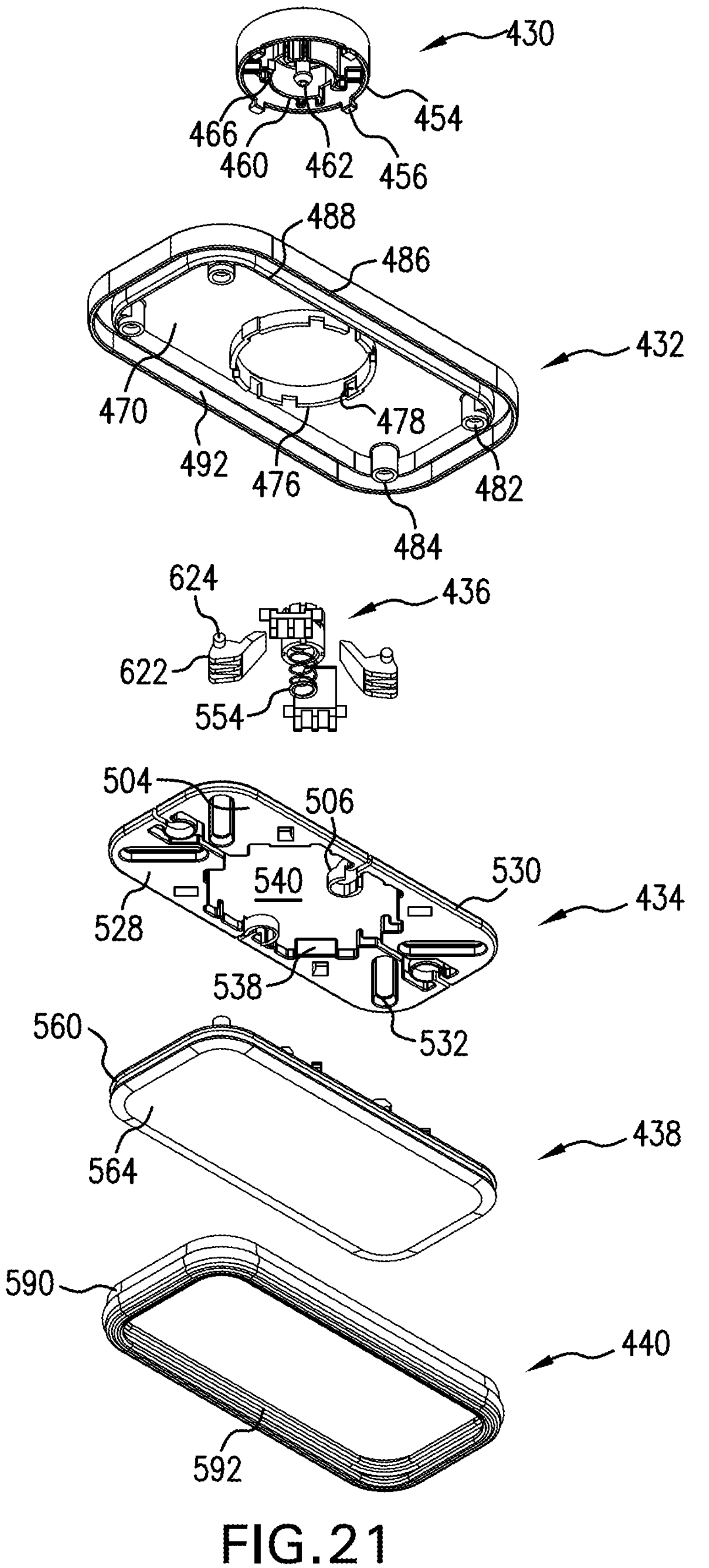
FIG. 21 is an exploded view of the lid depicted in FIG. 20 from a different (lower) perspective than that shown in FIG. 20.
Figure 24:
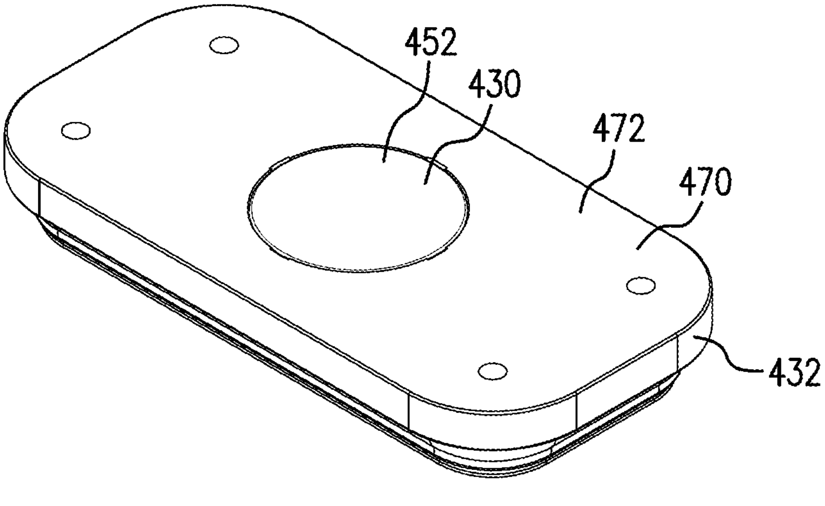
FIG. 24 is a perspective view of the button, a top lid and the base of the lid of FIGS. 20 and 21 with the button of the lid in the depressed (locked) position

FIGS. 20 and 21 depict a lid 414 that when assembled is similar in shape to the lid 214 (see FIG. 24). The lid 414 covers an opening of a container similar to the upper opening 22 shown in FIG. 2, but the container would be a different shape. The lid 414 can seal against the inner surface (similar to the inner surface 24 in FIG. 2) of such a container.

FIGS. 20 and 21 depict an exploded view of the lid 414. The lid 414 includes a button 430, a top lid 432, a web 434, a cam mechanism 436, a base 438, and a gasket 440. Movement of the button 430 in a first axial direction, e.g. parallel with a central 442, results in movement of the gasket 440 in a second axial direction, e.g. parallel with arrow 444, which is perpendicular to the first axial direction. Similar to the embodiments described above, downward actuation of the button 430 moves the gasket 440 from a contracted state toward an expanded state in which the gasket 440 would contact the inner surface of a container.

The button 430 includes an upper section 450 defining a top surface 452. The button 430 includes a peripheral skirt 454 that extends downwardly from a periphery of the upper section 450. Tabs 456 (four of which are shown in the illustrated embodiment) extend radially outwardly from a lower free end of the peripheral skirt 454. The tabs 456 facilitate connecting the button 430 with the top lid 432. With reference to FIG. 21, the button 430 includes an inner annular flange 460 and a barb 462 extending downwardly from the upper section 450. The barb 462 includes a cross-shaped base (not visible, but similar to the cross-shaped base 64, 264) and is provided for connecting the button 430 with the cam mechanism 436. The button 430 is similar to the buttons 30, 230 described above; however, the button 430 includes arm contact elements 466 provided on the inner annular flange 460. Four arm contact elements 466 are provided in the illustrated embodiment, and the arm contact elements 466 are angularly spaced from each other in a similar manner as the arms 302 shown in FIG. 18.

The top lid 432 includes an upper section 470 that defines an upper surface 472 of the lid 414. A button hole 474 is provided in the top lid 432 for receiving the button 430. An annular flange 476 depends downwardly from the upper section 470 and surrounds the button hole 474. Channels 478 are provided in the annular flange 476 to receive the tabs 456. The top lid 432 also includes fastener openings 482 that extend through standoffs 484 (FIG. 21) to facilitate attachment of the top lid 432 with the base 438. The top lid 432 also includes a vertically oriented peripheral skirt 486 and an internal vertical wall 488 that both depend downwardly from the upper section 470 to define channel 492 similar to the top lids 32 and 232 described above.

With reference to FIG. 14, the web 434 is an integrally formed piece of plastic material similar to the webs 34 and 234 described above; however, the web 434 is lacking the hub (similar to the hubs 100 and 300) and the integral arms (similar to the arms 102 and 302). The web 434 includes gasket pushers 504 and tensile connector elements 506. The web 434 includes a flat (planar) upper surface 526 and a flat (planar) lower surface 528, which are each normal to the central axis 442.

Each gasket pusher 504 includes a gasket contact surface 530 that contacts the gasket 440. In the illustrated embodiment, each gasket contact surface 530 is generally L-shaped in plan view. Each gasket pusher 504 includes an elongate opening 532 that is similar to the elongate opening 332 in the gasket pusher 304 to provide a locating feature for the gasket pusher 504 and the web 434, and also to limit movement of the gasket pusher. The gasket pusher 504 moves in a plane normal to the central axis 442 and parallel with either the upper surface 526 or the lower surface 528 to expand and contract the gasket 440. Each gasket pusher 504 is also provided with a wall 536 providing a vertical contact surface 538 that faces inwardly toward a central opening 540 of the web 434.

The tensile connector elements 506 interconnect adjacent gasket pushers 504. In the illustrated embodiment, four gasket pushers 504 are provided and interconnected by four tensile connector elements 506. In the illustrated embodiment, the web 434 is formed of a single piece of plastic material so that the gasket pushers 504 are interconnected by the respective tensile connector elements 506.

The cam mechanism 436 is similar to known ballpoint pen-type mechanisms. Instead of the ratchet teeth 112 (FIG. 4) on the hub 100 (FIG. 3) or the ratchet teeth 312 (FIG. 16) on the hub 300, a gear 544 having ratchet teeth 546, which are similar to the ratchet teeth 112 and 312, is trapped between the upper section 450 of the button 430 and a cam 548, which is similar in all respects to the cam 140 in FIG. 4. The barb 462 extends through the gear 544 and the gear 544 is rotatable with respect to the button 430.

The base 438 is formed of a plate 560 having an upper surface 562 facing toward the top lid 432 and a lower surface 564 (FIG. 21) that faces toward the inner volume of the container when the lid is on the container. Gasket pusher standoffs 566 extend upwardly from the upper surface 562 and are received in the elongate openings 532 provided in each gasket pusher 504. Each of the gasket pusher standoffs 566 in each respective corner of the base 438 can also align with the standoffs 484 in the top lid 432 to receive fasteners to connect the top lid 432 with the base 438. The top lid 432 can connect with the base 438 in other conventional manners. The standoffs 566 are shown as extending upwardly from the base 438; however, if desired, the standoffs could extend downwardly from the upper section 470 of the top lid 432. Arm mounts 572 extend upwardly from the upper surface 562. Four pairs of arm mounts 572 are provided in the illustrated embodiment. Each arm mount includes an axle recess 574.

The base 438 further includes a central annular boss 576 having inwardly extending projections 578 that terminate above slots 580 extending radially through the central annular boss 576. The cam mechanism 436 is received in the central annular boss 576 and vertical channels 550 in the cam 548 cooperate with the projections 578 in a known manner so that the button 430 is stable in an projected position in which the top surface 452 of the button is offset from the upper surface 472 of the lid 414 (similar to the button 230 shown in FIG. 13) and in a depressed position in which the top surface 452 of the button 430 is nearer to the upper surface 472 of the lid 414 as compared to the projected position. The top surface 452 of the button 430 can be substantially flush with the upper surface 472 of the lid 414 when the button 430 is in the depressed position (see FIG. 24). The ratchet teeth 546 on the gear 544 cooperate with ratchet teeth 552 on the cam 548 in a manner similar to a known ballpoint pen mechanism, which allows the button to maintain one of the projected position and the depressed position.

The gasket 440 is a ring-shaped body 590 that is generally vertically oriented. The ring-shaped body 590 of the gasket 440 includes an inner surface 592 that fits around the base 438 and the web 434.

In the embodiment illustrated in FIGS. 20 and 21, a plurality of arms 602, which are separate from the web 434, i.e., not integrally formed with the web 434, are provided. Each arm 602 operatively connects the button 430 with a respective gasket pusher 504. Movement of the button 430 results in movement of the arms 602, which results in movement of the gasket pushers 504, which results in movement of the gasket 440.

The arms 602 are angularly spaced from each other similarly to the arms 302 in the embodiment depicted in FIG. 18. Each arm 602 includes a proximal contact surface 620 that contacts a respective arm contact element 466 on the button 430. Each arm 602 includes a distal contact surface 622 that contacts a respective gasket pusher 504. Each arm 602 also includes axle posts 624 that are each received in a respective axle recess 574 for connecting the arms 602 with the base 438. Each arm 602 pivots about an axis centered with the respective axle posts 624 when a downward force (parallel with the central axis 442) is applied to the proximal contact surface 620 or when a force perpendicular to the central axis 442 is applied to the distal contact surface 622.

Figure 22:
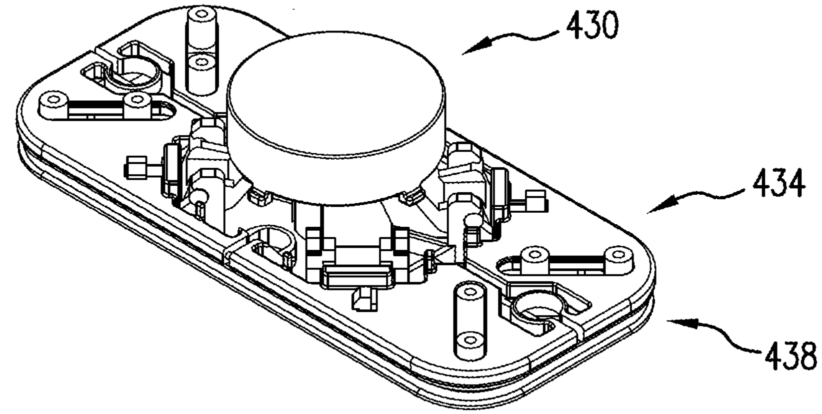
FIG. 22 is a perspective view of a button, a web and a base of the lid of FIGS. 20 and 21 with a button of the lid in a projected position.
Figure 23:
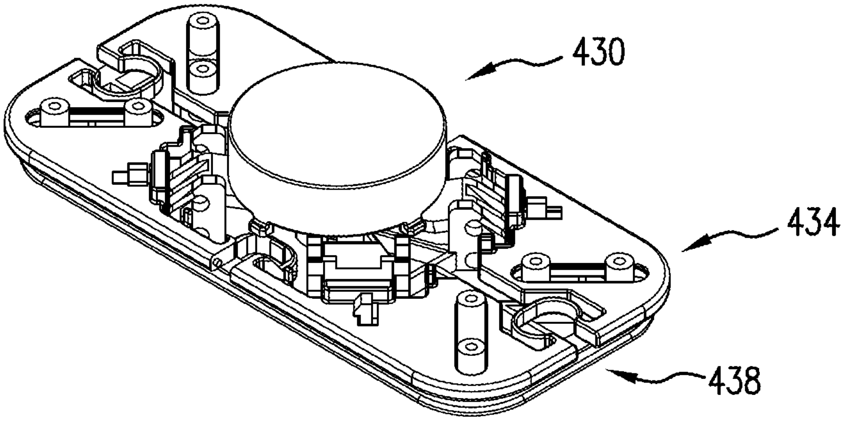
FIG. 23 is a perspective view of the button, the web and the base of the lid of FIGS. 20 and 21 with the button of the lid in a depressed (locked) position.

The button 430 is moveable in a first axial direction (parallel with arrow 442 in FIG. 20) with respect to the top lid 432 between an projected position (shown in FIG. 22 and similar to the button 230 shown in FIG. 13) and a depressed position where the top surface 452 of the button 430 is flush with the upper surface 472 of the lid 414 (see FIG. 24). Because of the cam mechanism 436 being similar to a known ballpoint pen mechanism and the connection between the cam mechanism 436 and the button 430, the button 430 can remain in the depressed position until pressed again, at which time a spring 554 would bias the button 430 from the depressed position toward the projected position. Movement of the button 430 from the projected position toward the depressed position results in pivotal movement of at least one of the arms 602 (each arm in the illustrated embodiment). Each arm 602 pivots on the axle posts 624 as the button 430 is being depressed. This pivotal movement in each arm 602 results in the distal contact surface 622, which is cam shaped, to contact the vertical contact surface 538 on the wall 536. Due to the cam shape of the distal contact surface 622, this pivotal movement of the arm 602 results in the arm 602 moving (pushing) the gasket pusher 504 in the second axial direction (parallel with arrow 444 in FIG. 20), which results in the gasket 440 moving toward an expanded state where the gasket 440 can contact the inner surface of the container. This is evident when comparing FIG. 22 to FIG. 23. With the button 430 in the depressed state (FIG. 24), the gasket 440 is in contact with the inner surface of the container to seal the container. With the button 430 in the depressed state, the button 430 can be pressed again and the cam mechanism 436 can operate so that the spring 554 biases the button 430 toward the projected position. As the button 430 moves from the depressed position toward the projected position, a resilient force applied by the web 434 wanting to return to its original shaped and the gasket 440 also wanting to return to its original shape acts against the distal contact surface 622 of each arm through the vertical contact surface 538 on the wall 536 of each gasket pusher 504. This results in each arm 602 pivoting in an opposite direction at the axle posts 624 as the button 430 moves. With the gasket pushers 504 being drawn toward the central opening 540 in the web 434, the gasket 440 no longer engages the inner surface of the container.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A web for expanding a gasket, the web comprising:
- a hub;
- a plurality of arms connected with and extending outwardly from the hub;
- a plurality of gasket pushers each connected with a respective arm, each gasket pusher including a gasket contact surface for contacting the gasket, wherein movement of the hub in a first axial direction results in movement of the gasket pushers in a second axial direction, which is transverse to the first axial direction; and
- a plurality of tensile connector elements, each of the tensile connector elements interconnecting adjacent gasket pushers.

2. The web of claim 1, wherein each arm includes a first hinge section connecting the respective arm with the hub and a second hinge section connecting a respective gasket pusher with the respective arm.

3. The web of claim 2, wherein each gasket pusher includes a lower surface normal to the first axial direction, and each gasket pusher and the respective second hinge section moves in a plane parallel with the lower surface.

4. The web of claim 2, wherein the gasket contact surface defines a corner and a line emanating from a center point of the hub bisecting a respective arm is coincident with a respective corner.

5. The web of claim 2, wherein the gasket contact surface defines a corner and a line emanating from a center point of the hub bisecting a respective arm is offset from a respective corner.

* * * * *